United States Patent
Van Der Auwera et al.

(10) Patent No.: US 10,313,664 B2
(45) Date of Patent: Jun. 4, 2019

(54) ADJUSTING FIELD OF VIEW OF TRUNCATED SQUARE PYRAMID PROJECTION FOR 360-DEGREE VIDEO

(71) Applicant: QUALCOMM Incorporated, San Diego, CA (US)

(72) Inventors: Geert Van Der Auwera, Del Mar, CA (US); Muhammed Coban, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 9 days.

(21) Appl. No.: 15/862,468

(22) Filed: Jan. 4, 2018

(65) Prior Publication Data

US 2018/0199029 A1    Jul. 12, 2018

Related U.S. Application Data

(60) Provisional application No. 62/445,183, filed on Jan. 11, 2017.

(51) Int. Cl.
*H04N 13/161*    (2018.01)
*H04N 13/363*    (2018.01)
(Continued)

(52) U.S. Cl.
CPC .............. *H04N 13/363* (2018.05); *G06T 3/00* (2013.01); *H04N 5/2628* (2013.01); *H04N 13/111* (2018.05); *H04N 13/161* (2018.05)

(58) Field of Classification Search
CPC ...... G06T 3/00; H04N 13/111; H04N 5/2628; H04N 13/363; H04N 13/161
See application file for complete search history.

(56) References Cited

U.S. PATENT DOCUMENTS

| | | | | |
|---|---|---|---|---|
| 5,670,984 A | * | 9/1997 | Robertson | G06T 3/0025 345/427 |
| 2014/0087867 A1 | * | 3/2014 | Hightower | G02B 27/017 463/31 |

(Continued)

OTHER PUBLICATIONS

Choi B., et al., "WD on ISO/IEC 23000-20 Omnidirectional Media Application Format", 116th MPEG Meeting; Oct. 17, 2016-Oct. 21, 2016; Chengdu; (Motion Picture Expert Group or ISO/IEC JTC1/SC29/WG11),, No. N16439, Nov. 14, 2016, XP030023111, 55 pages.

(Continued)

*Primary Examiner* — Zhihan Zhou
(74) *Attorney, Agent, or Firm* — Kilpatrick Townsend & Stockton, LLP

(57) ABSTRACT

Techniques and systems are described for encoding 360-degree video data using the planes of a truncated square pyramid to map the 360-degree data for different fields of view. 360-degree video data can include multiple frames, where each frame includes spherical video data. In various implementations, a video coding system can select a field of view for the video data, and determine an offset from the center of the spherical video data that corresponds to the field of view. Using the offset, the system can determine a projection of the spherical video data onto the planes of the truncated square pyramid, where the base plane represents a front view and the top plane represents a back view. The system can then map the video data according to the projection such that each plane of the truncated square pyramid includes a portion of the spherical video data.

30 Claims, 25 Drawing Sheets

(51) Int. Cl.
*H04N 13/111* (2018.01)
*G06T 3/00* (2006.01)
*H04N 5/262* (2006.01)

(56) References Cited

U.S. PATENT DOCUMENTS

| | | |
|---|---|---|
| 2014/0176542 A1 | 6/2014 | Shohara et al. |
| 2015/0364159 A1* | 12/2015 | Ushiyama .......... H04N 21/4668 386/230 |
| 2015/0365622 A1* | 12/2015 | Ushiyama .............. H04N 5/765 386/230 |
| 2017/0084073 A1* | 3/2017 | Pio .......................... G06T 15/20 |
| 2017/0301132 A1* | 10/2017 | Dalton .................... G06T 15/04 |
| 2018/0160119 A1* | 6/2018 | Su ........................ H04N 19/597 |

OTHER PUBLICATIONS

International Search Report and Written Opinion—PCT/US2018/012595—ISA/EPO—Mar. 22, 2018.
Van Der Auwera G., et al., "AHG8: Truncated Square Pyramid Projection (TSP) for 360 Video", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://Phenix.int-evry.fr/jvet/, No. JVET-D0071, Oct. 6, 2016 (Oct. 6, 2016), XP030150304, 9 Pages.

\* cited by examiner

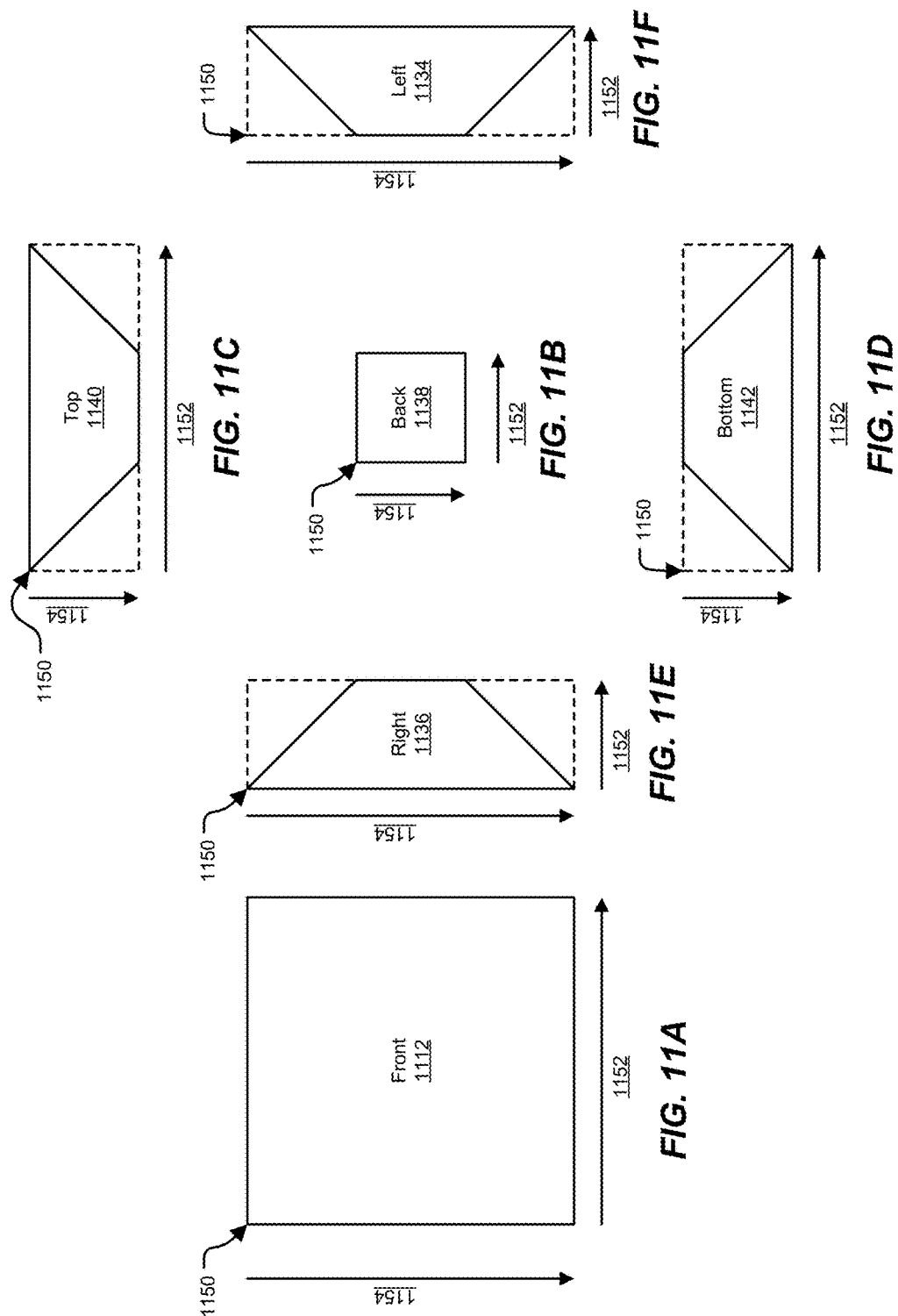

ADJUSTING FIELD OF VIEW OF TRUNCATED SQUARE PYRAMID PROJECTION FOR 360-DEGREE VIDEO

CROSS-REFERENCES TO RELATED APPLICATIONS

This application claims priority to U.S. Provisional Application No. 62/445,183, filed on Jan. 11, 2017, which is incorporated by reference herein in their entirety.

BACKGROUND

Virtual reality (VR) describes a three-dimensional, computer-generated environment that can be interacted within a seemingly real or physical way. Generally, a user experiencing a virtual reality environment can turn left or right, look up or down, and/or move forwards and backwards, thus changing her point of view of the virtual environment. The 360-degree video presented to the user can change accordingly, so that the user's experience is as seamless as in the real world. Virtual reality video can be captured and rendered at very high quality, potentially providing a truly immersive virtual reality experience.

To provide a seamless 360-degree view, the video captured by a 360-degree video capture system typically undergoes image stitching. Image stitching in the case of 360-degree video generation involves combining or merging video frames from adjacent cameras in the area where the video frames overlap or would otherwise connect. The result would be an approximately spherical frame. Similar to a Mercator projection, however, the merged data is typically represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices generally operate on a raster principle—meaning that a video frame is treated as a grid of pixels—thus square or rectangular planes are typically used to represent a spherical environment.

BRIEF SUMMARY

In various implementations, techniques and systems are described for mapping 360-degree video data to a truncated square pyramid shape. A truncated square pyramid is a square pyramid whose top has been cut off. A truncated square pyramid thus has a square base, a square top, and four trapezoid-shaped sides. A 360-degree video frame can include 360-degrees' worth of pixel data, and thus be spherical in shape. By mapping the spherical video data to the planes provided by a truncated square pyramid, the total size of the 360-degree video frame can be reduced while only sacrificing some fidelity at the edges of the viewer's field of view. The planes of the truncated square pyramid can be oriented such that the base of the truncated square pyramid represents a front view and the top of the truncated square pyramid represents a back view. In this way, the front view can be captured at full resolution, the back view can be captured at reduced resolution, and the left, right, up, and bottom views can be captured at decreasing resolutions.

In various implementations, the field of view provided by the truncated square pyramid mapping geometry can be varied. For example, a 90-degree, 135-degree, 180-degree, or other field of view can be mapped into base plane, where the base plane provides a forward view of the spherical 360-degree video data.

According to at least one example, a method for encoding video data is provided. In various implementations, the method includes obtaining virtual reality video data representing a 360-degree view of a virtual environment, wherein the virtual reality video data includes a plurality of frames, and wherein each frame from the plurality of frames includes corresponding spherical video data. The method further includes determining a field of view for a frame from the plurality of frames. The method further includes determining an offset from a center of the spherical video data for the frame, the offset corresponding to the field of view. The method further includes determining, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the bottom plane. The method further includes mapping, according to the projection, the spherical video data to the planes of the truncated square pyramid, wherein each plane includes a portion of the spherical video data.

In another example, an apparatus is provided that includes a memory configured to store video data and a processor. The processor is configured to and can determine an offset from a center of the spherical video data for the frame, the offset corresponding to the field of view. The processor is configured to and can determine a field of view for a frame from the plurality of frames. The processor is configured to and can determine an offset from a center of the spherical video data for the frame, the offset corresponding to the field of view. The processor is configured to and can determine, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the bottom plane. The processor is configured to and can map, according to the projection, the spherical video data to the planes of the truncated square pyramid, wherein each plane includes a portion of the spherical video data.

In another example, a non-transitory computer-readable medium is provided having stored thereon instructions that, when executed by one or more processors, cause the one or more processors to perform operations including obtaining virtual reality video data representing a 360-degree view of a virtual environment, wherein the virtual reality video data includes a plurality of frames, and wherein each frame from the plurality of frames includes corresponding spherical video data. The instructions can further cause the one or more processors to perform operations including determining a field of view for a frame from the plurality of frames. The instructions can further cause the one or more processors to perform operations including determining an offset from a center of the spherical video data for the frame, the offset corresponding to the field of view. The instructions can further cause the one or more processors to perform operations including determining, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the bottom plane. The instructions can further cause the one or more processors to perform operations including mapping, according to the projection, the spherical video data to the planes of the truncated square pyramid, wherein each plane includes a portion of the spherical video data.

In another example, an apparatus is provided that includes means for obtaining virtual reality video data representing a 360-degree view of a virtual environment, wherein the virtual reality video data includes a plurality of frames, and wherein each frame from the plurality of frames includes corresponding spherical video data. The apparatus further comprises means for determining a field of view for a frame from the plurality of frames. The apparatus further comprises means for determining an offset from a center of the spherical video data for the frame, the offset corresponding to the field of view. The apparatus further comprises means for determining, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the bottom plane. The apparatus further comprises means for mapping, according to the projection, the spherical video data to the planes of the truncated square pyramid, wherein each plane includes a portion of the spherical video data.

In some aspects, the methods, apparatuses, and computer-readable medium described above further comprise determining a point on a plane from the planes of the truncated square pyramid. These aspects further include determining a pixel from the spherical video data that corresponds to the point on the plane.

In some aspects, the planes of the truncated square pyramid include a first side plane, a second side plane, a third side plane, and a fourth side plane, wherein each of the first side plane, the second side plane, the third side plane, and the fourth side plane include one edge that is adjacent to the base plane, one edge that is adjacent to the top plane, and two edges that are adjacent to two other of the first side plane, the second side plane, the third side plane, and the fourth side plane.

In some aspects, a resolution of each of the first side plane, the second side plane, the third side plane, and the fourth side plane decreases from the edge adjacent to the base plane to the edge adjacent to the top plane.

In some aspects, the top plane has a lower resolution than the base plane. In some aspects, the top plane has a minimum size that is irrespective of the offset, wherein the minimum size is greater than zero. In some aspects, offset corresponds to a field of view that makes a size of the top plane zero.

In some aspects, determining the projection includes determining, using the offset, a first projection of a first portion of data from the spherical video data onto the base plane. Determining the offset further includes determining, using the offset, a second projection of a second portion of data from the spherical video data onto the top plane.

In some aspects, determining the projection includes determining, using a size of the base plane and a size of the top plane, a third projection of a third portion of data from the spherical video data onto a first side plane, the third projection including a view above the field of view. In these aspects, determining the projection further includes determining, using a size of the base plane and a size of the top plane, a fourth projection of a fourth portion of data from the spherical video data onto a second side plane, the fourth projection including a view below the field of view. Determining the projection further includes determining, using a size of the first square plane and a size of the second square plane, a fifth projection of a fifth portion of data from the spherical video data onto a third side plane, the fifth projection including a view to the right of the field of view, and determining, using a size of the first square plane and a size of the second square plane, a sixth projection of a sixth portion of data from the spherical video data onto a fourth side plane, the sixth projection including a view to the left of the field of view.

In some aspects the field of view is greater than 90 degrees.

In some aspects, the methods, apparatuses, and computer-readable medium described above further comprise packing each of the planes in a rectangular format.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 11A-FIG. 11F are diagrams illustrating the location, width, and height of each region of the truncated square pyramid geometry.

DETAILED DESCRIPTION

Figure 1:
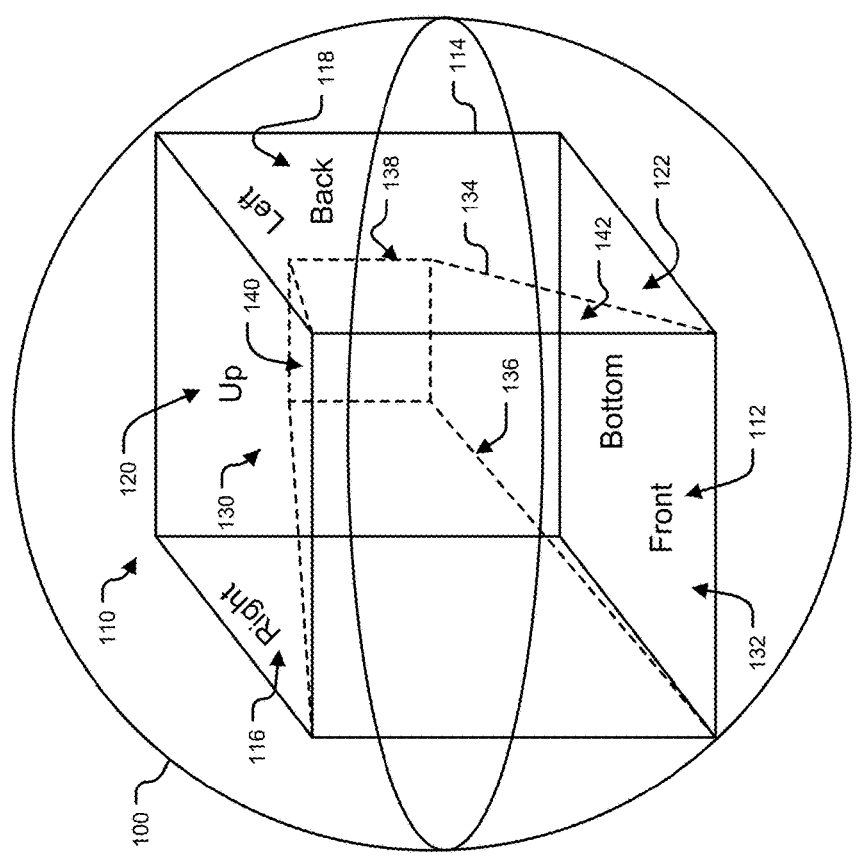
FIG. 1 is a diagram illustrating an example of a virtual environment represented by a sphere that includes the pixels captured by a virtual reality video capture device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides examples only, and is not intended to limit the scope, applicability, or configuration of the disclosure. Rather, the ensuing description of various examples will provide those skilled in the art with an enabling description for implementing any of the examples. It should be understood that various changes may be made in the function and arrangement of elements without departing from the spirit and scope of the invention as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, various examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality (VR) describes a three-dimensional, computer-generated environment that can be interacted with in a seemingly real or physical way. In some cases, a user experiencing a virtual reality environment uses electronic equipment, such as a head-mounted display (HMD) and optionally also other articles that can be worn, such as gloves fitted with sensors, to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. Virtual reality video can be captured and rendered at very high quality, potentially providing a truly immersive virtual reality experience. Virtual reality applications include gaming, training, education, sports video, and online shopping, among others.

360-degree video is video captured for display in a virtual reality environment. For example, a frame of 360-degree video can include a full 360 degrees of visible from a given point, such that the frame includes pixels for all or part of a sphere centered on the point. A frame of 360-degree video can be computer-generated, and be used to present fictional environments. In some applications, video from the real world can be used in the presentation of a virtual reality environment. In these applications, a user can experience another location in the same way that the user can experience a present location. For example, a user can experience a walking tour of Berlin while using a 360-degree video system that is situated in San Francisco.

A 360-degree video system typically includes a video capture device and a video display device, and possibly also other intermediate devices such as servers, data storage, and data transmission equipment. A video capture device may include a camera set, that is, a set of multiple cameras, each oriented in a different direction and capturing a different view. In various applications, two to six cameras can be used to capture a full 360-degree view centered on the camera set's location. Some video capture devices may use fewer cameras, such as for example video capture devices that capture primarily side-to-side views. A video includes frames, where a frame is an electronically coded still image of a scene. Cameras capture a certain number of frames per second, which is referred to as the camera's frame rate.

In some cases, to provide a seamless 360-degree view, the video captured by each of the cameras in the camera set undergoes image stitching. Image stitching in the case of 360-degree video generation involves combining or merging video frames from adjacent cameras in the area where the video frames overlap or would otherwise connect. The result is an approximately spherical frame of video data. To integrate with existing video systems, the spherical frame of video data can be mapped to a planar format. For mapping techniques such as those used to generate Mercator projections can be used to produce an equirectangular format. As another example, the pixels in a merged video frame may be mapped onto the planes of a cube shape, or some other three-dimensional, planar shape (e.g., a pyramid, an octahedron, a decahedron, etc.). Video capture and video display devices operate on a raster principle—meaning that a video frame is treated as a grid of pixels—thus square or rectangular planes are typically used to represent a spherical environment.

360-degree video frames, mapped to a planar representation, can be encoded and/or compressed for storage and/or transmission. Encoding and/or compression can be accomplished using a video codec (e.g., a codec that is compliant with the High Efficiency Video Coding (HEVC) standard, which is also known as H.265, or a codec that is compliant with the Advanced Video Coding standard, which is also known as H.264, or another suitable coding standard) and results in a encoded and/or compressed video bitstream or group of bitstreams. Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

To provide an immersive experience to a viewer, 360-degree video content can be generated at high quality resolutions and at high frame rates. Video captured at high resolution and high frame rate, however, can occupy a large amount data. The human visual system can distinguish up to 60 pixels-per-degree of field of view (FOV), and the average person can see nearly 180 degrees in all directions. Table 1 provides examples of several display devices, the approximate field of view each device provides, an example resolution for each device, and equivalent resolution each device would need to a provide 360-degree video experience.

TABLE 1

| Device | Screen Size | FOV | Resolution | ppi | 360 Video Res. (2D) |
|---|---|---|---|---|---|
| TV | 40" diag. (16:9) | ~30° | 1920 × 1080 | 48 | 7680 × 2160 |
| iPhone 6S+ | 5.5" diag. (16:9) | ~30° | 1920 × 1080 | 400 | 7680 × 2160 |
| HMD | 2.5" × 2.5"/ eye (1:1) | ~90° | 5400 × 5400 | 2160 | 21600 × 10800 |

As noted in Table 1, a modern 40-inch television, which may have a resolution of 1920 pixels wide by 1080 pixels high and use 48 pixels-per-inch (ppi), may provide a picture that is sufficiently realistic to the average viewer, though limited to about a 30 degree field of view. To expand a 48 ppi television to a 360-degree video resolution would require expanding the size of the resolution to 7680×2160 pixels wide and high (assuming video displayed with a 90-degree field of view on the television). As this picture is eight times as large, it would also require eight times as much data to represent each video frame. In contrast, a head-mounted display may have screens that are 2.5"×2.5" per eye, but may have a resolution of 5400×5400, at 2160 ppi, per screen. To expand this head-mounted display resolution to 360-degree video resolution would require a resolution of 21600×10800 pixels high and wide, and correspondingly large amount of bits per frame.

Video content can be transmitted, for example to home television receivers, computers, tablet computers, handheld devices, or other display devices. Video content can also be stored on a server or in a data center, from which the content may be transmitted to display devices. Due to the high resolution and high frame rates of virtual reality video content, storage and transmission of virtual reality video requires that the video content be represented efficiently. Additionally, some decoding devices may require that a video frame be limited to a particular size. For example, some decoders require that the resolution for one video frame be no more than 1920×1080 or 3840×2160 pixels in size.

In some applications, full 360-degree content is provided to a viewer. In this case, all possible viewports are available simultaneously to the viewer, even when the viewer is facing in a particular direction. The direction in which the viewer is facing is typically referred to as the viewport, and the content the viewer can see from this viewport is typically referred to as the field of view. Providing the viewer with full 360-degree video content, however, may require a large amount of data, possibly more than can be efficiently transmitted or decoded by decoder device. Additionally, a full 360-degree video may provide the viewer with more than the viewer can see at any given moment.

Various techniques can be used to format full 360-degree video content, so that the data can be stored and/or transmitted more efficiently. For example, one technique is to limit the content that is transmitted to the content for the viewer's current viewport. Once the viewer's head position changes, the content for a different viewport can be transmitted. To avoid gaps between the viewports, content for one or more additional viewports may be transmitted simultaneously to the viewer. This alternative may reduce transmission bandwidth, but the gap-filling viewports may have lower quality, lower resolution, and/or a lower frame rate, which may be noticeable to some viewers.

Another technique is illustrated in FIG. 1. FIG. 1 illustrates an example of a virtual environment represented by a sphere 100 that includes the pixels captured by a 360-degree video capture device. In this example, the pixels in the sphere 100 have been mapped onto six planes provided by the six faces of a cube 110 (also referred to as a cube shape), where the six planes have been designated front 112, left 114, right 116, back 118, up 120, and bottom 122. The designations describe the direction in which a viewer would be looking when viewing a particular video frame. In various implementations, other three-dimensional shapes can be used to represent the spherical frame data. In this example, the six faces represent full-frame video; that is, all 360-degrees of view are represented, with a minimum loss of fidelity at the edges of the cube 110.

As discussed above and in further detail below, full-frame video may contain a large amount of data. Additionally, a full frame of video may include more data than a viewer can see at any given moment. Thus, in various implementations, the six planes provided by the cube 110 of FIG. 1 can be mapped to six planes provided by a truncated square pyramid 130 shape. A truncated square pyramid is a pyramid with a square base and with the peak of the pyramid removed, perpendicular to the base. Mathematically, a truncated square pyramid is described as a pyramidal frustum for a square pyramid.

In this example, the base 132 of the truncated square pyramid 130 is oriented to align with the side of the cube 110 that has been designated as the front 112, such that the plane representing the front 112 of the cube 110 can be mapped onto a plane represented by the base 132 of the truncated square pyramid 130. Furthermore, the plane representing the back 118 of the cube can be mapped onto a plane representing the top 138 of the truncated square pyramid 130, and each of the left 114, right 116, up 120, and bottom 122 planes of the cube 110 can be mapped onto a corresponding plane representing the sides of the truncated square pyramid 130.

While the base 132 plane of the truncated square pyramid 130 may include as much data as the front 112 plane of the cube 110, the top 138 plane of the truncated square pyramid 130 potentially includes much less data than the back 118 plane of the cube 110. Because the front 112 view is the direction the viewer is looking, the full-frame data should be preserved, but the viewer is not likely to able to see the back 118 view, thus less data can be stored for the back 118 view. As discussed further below, the back 118 view is not eliminated entirely, however, so that, for example, transitions in view can be smoother.

Due to their trapezoidal shape, each of the left 134, right 136, up 140, and bottom 142 planes of the truncated square pyramid 130 are can include less data than the corresponding planes provided by the cube 110. More data is preserved in the direction of the front 112 view, while less data is preserved in the direction of the back 118 view. Using the truncated square pyramid 130 shape as the basis for mapping the spherical frame data thus potentially reduces the size of a video frame over a full-frame representation. In various examples, the size reduction can be adjusted by changing the dimensions of the truncated square pyramid 130, for example by increasing or decreasing the size of the top 138 plane of the truncated square pyramid 130.

Mapping the square planar data from the cube 110 shape onto the planes provided by the truncated square pyramid 130 can be accomplished using a compression, filtering, and/or downsampling methods. For example, the top 138 plane of the truncated square pyramid 130 may include the same view as the back 118 plane of the cube 110, but at a lower resolution or quality. Similarly, the left 134, right 136, up 140, and bottom 142 planes of the truncated square pyramid 130 also include the same view as the corresponding planes of the cube 110, but with decreasing resolutions. Specifically, the resolution or quality may decrease, with the highest resolution being in the direction of the base 132 of the truncated square pyramid and the lowest resolution being towards the top 138 of the truncated square pyramid 130. Downsampling can be applied in a graduated fashion, for example, decreasing from the base edge to the top edge of the trapezoid shapes of the left 134, right 136, up 140, and bottom 142 planes.

In some implementations, one truncated square pyramid mapping can be provided for each of the six views provided by a cube-shaped representation of the virtual environment.

For example, in the example of FIG. 1, the truncated square pyramid 130 has been oriented so that the base 132 of the truncated square pyramid is oriented towards the front 112 face of the cube 110. This orientation assumes the viewer is looking in the direction designated as front 112 in this example. As discussed above, a mapping of the video frame data can be determined using the planes provided by the faces of the truncated square pyramid 130. In this orientation, the truncated square pyramid 130 gives a mapping where the front 112 has the highest quality, and the back 118 view has the lowest quality.

The truncated square pyramid 130 can also be oriented so that the base 132 is oriented towards the left 114 face of the cube 110. This orientation assumes that the viewer is looking in the direction designated as left 114 in this example. A mapping of the same video frame data can be determined in this orientation, giving a mapping where the left 114 view has the highest quality and the right 116 view has the lowest quality.

Similar mapping can be obtained with the truncated square pyramid 130 so that the base 132 is oriented towards the right 116 view, the back 118 view, the up 120 view, and the bottom 122 view, so that a total of six mappings are obtained for the same frame of 360-degree video data. Having six mappings enables the video data to provide the highest available quality for a given video frame, no matter which direction the viewer is looking.

In various implementations, more or fewer than six mappings may be used. For example, in some implementations, one video frame may be mapped to just a front 112 view, or just a front 112, left 114, and right 116 views. In some implementations, the number of mappings used for a given video frame may be tuned to the content of the video frame. For example, in some cases, it may be assumed that the viewer may never look up or down. As another example, in some implementations, overlapping mappings may be used. For example, a mapping may be determined with the base 132 of the truncated square pyramid 130 oriented at a 45-degree angle between the front 112 and left 114 views. In these implementations, a better representation of the spherical data may be obtained.

Truncated square pyramid mappings can also be used to minimize the amount of data that needs to be provided to a viewer at any given moment. For example, a transmitting device may provide one truncated square pyramid mapping to a viewer, where the truncated square pyramid mapping corresponds to the direction in which the viewer is currently looking. As the viewer turns her head left, the transmitting device can switch to a second truncated square pyramid mapping (e.g., one oriented towards left view). Should the transmission of the second truncated square pyramid mapping be delayed (e.g., due to network delays, intra-frame periods, or for some other reason), the viewer may be presented with the first truncated square pyramid mapping until the second truncated square pyramid is available. Depending on the viewer's head position and the truncated square pyramid map, the viewer may experience lower quality until the second truncated square pyramid map is received.

Figure 2A:
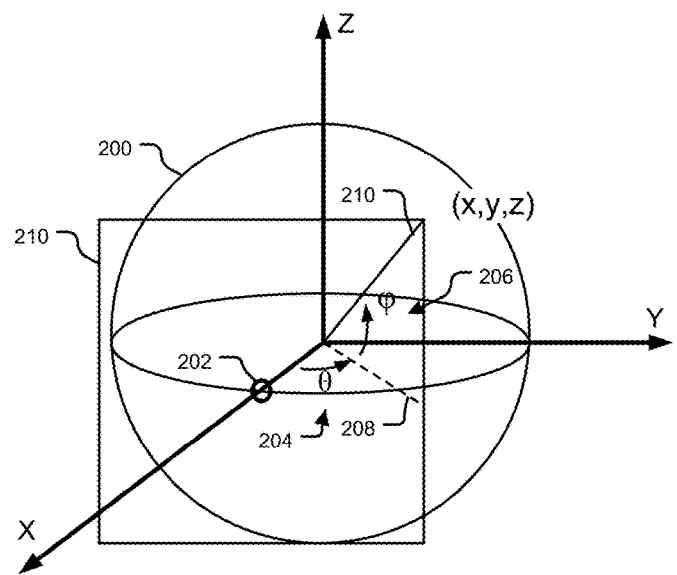
FIG. 2A is a diagram illustrating an example of a reference coordinate system that can be used to map the pixels in a spherical representation of a virtual reality environment to a equirectangular, planar representation.

FIG. 2A illustrates a reference coordinate system that can be used to map the pixels in a spherical representation of a virtual reality environment to a equirectangular, planar representation. In some implementations, an equirectangular representation of the spherical data may be used to map the data to the planes provided by the faces of a truncated square pyramid.

In this example, the sphere 200 that provides the video pixels is provided with an x axis, a y axis, and a z axis, which can be used to represent three-dimensional coordinates on the surface of the sphere 200. For purposes of this example, a plane 210 is centered at the point at which the x axis intersects the surface of the sphere 200 (marked with a circle 202), and is oriented perpendicular to the x axis. Given this arrangement, pixels from the sphere 200 of FIG. 2A can be mapped to the plane 210 using the following equations:

$$\theta = \tan^{-1}\frac{y}{x}, \theta \to [-\pi, \pi]$$
$$\varphi = \tan^{-1}\frac{z}{r}, \varphi \to [-\frac{\pi}{2}, \frac{\pi}{2}]$$
$$r = \sqrt{x^2 + y^2}$$

In the above, the equation for θ 204 can be visualized as a line 208 (e.g., the dotted line 208 in the FIG. 2A) between the center of the sphere 200 and the surface of the plane 210, where the line 208 rotates from θ=—π to π (e.g., approximately −3.1415 to 3.1415), with the x axis being θ=0. At any given value of θ 204, the pixel at the point where the line 208 intersects the sphere 200 can be selected and mapped to the corresponding point (for the same value of θ 204) where the line 208 touches the plane 210. Similarly, the equation for φ 206 can be visualized as a line 208 from the center of the sphere 200 to the surface of the plane 210, where the line 208 rotates from −π/2 to π/2 (e.g., approximately −1.57 to 1.57), with the plane formed by the x and y axes being φ=0. At any given value of φ 206, the pixel at the point where the line 208 intersects the sphere 200 can be selected and mapped to a corresponding point (for the same value of φ) where the line 210 touches the plane 210. All the pixels in the sphere 200 can be mapped to the plane 210 by rotating θ and φ at the same time.

Figure 2B:
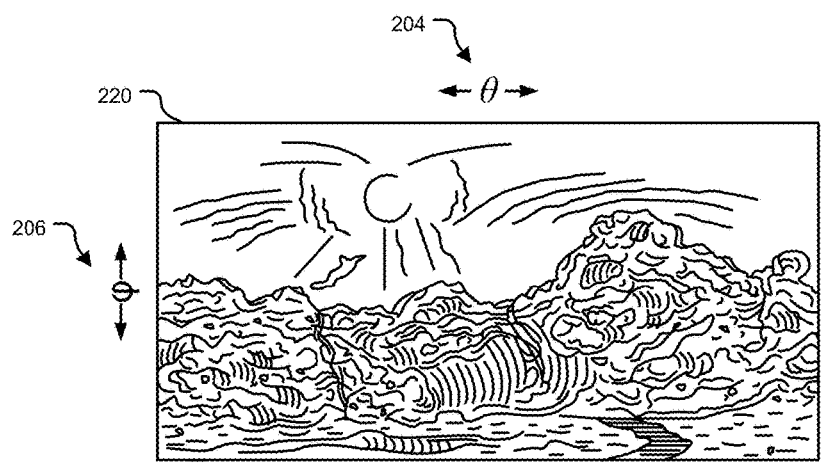
FIG. 2B is a diagram illustrating an example of a video frame that has been mapped to an equirectangular plane.

FIG. 2B illustrates an example of a video frame 220 that has been mapped to an equirectangular plane, using the equations and method described above. The result is similar to a Mercator projection, or an equidistant cylindrical projection, for example. As illustrated in this example, the equation above for θ 204 provides the horizontal translation from the sphere to the plane, and the equation for φ 206 provides the vertical translation. FIG. 2B also illustrates an example of a full video frame 220, where each pixel from a spherical representation of the world has been captured in a planar representation.

Figure 3:
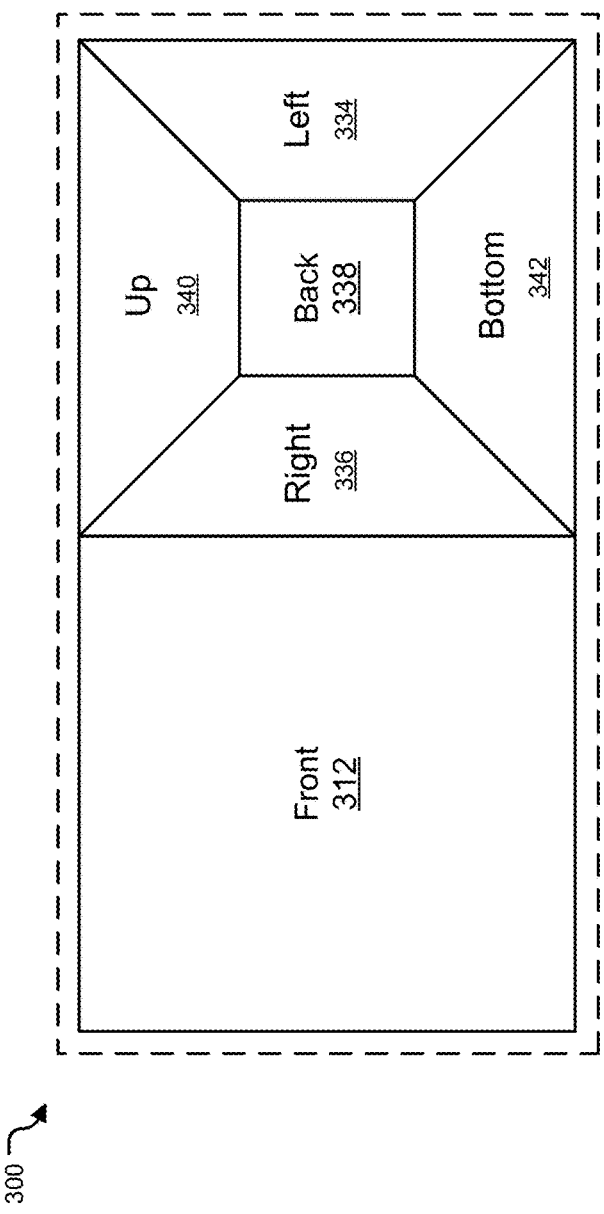
FIG. 3 is a diagram illustrating an example of a frame packing structure for a frame of video data that has been mapped to a truncated square pyramid shape.

As noted above, a full frame of virtual reality video, captured at a high-resolution, can include a large amount of data, not all of which may be needed at a given moment. As also noted above, mapping a cube-shaped representation of the video data to a truncated square pyramid shape can reduce the amount of data to an amount that may be easier to store and transport. FIG. 3 illustrates an example of a frame packing structure 300 for a frame of video data that has been mapped to a truncated square pyramid shape. A frame packing structure can define the format for packing the data for a video frame into a single block of data that can be stored, transported, and processed by a video decoder. That is, the frame packing structure can indicate which data should be located at which point in the data block. In various implementations, a frame packed according the frame packing structure such as is illustrated in FIG. 3 can include information (e.g., a flag, a field, and/or a code) that indicates the packing structure used in the frame. A decoding device can use the indicated packing structure to identify video data located at a particular point in the data block that represents a frame.

As discussed above, a truncated square pyramid has a base plane, a top plane, a left plane, a right plane, an up plane, and a bottom plane. As also discussed above, each of the planes of the truncated square pyramid can be associated with a particular view of a virtual reality video frame. Specifically, the base plane can be designated as the front 312 view, the top plane can be designated as the back 338 view, the left plane can be designated as the left 334 view, the right plane can be designated as the right 336 view, the up plane can be designated as the up 340 view, and the bottom plane can be designated as the bottom 342 view. Using these designations, the front 312 view is considered "front" because it is the direction a viewer is assumed to be facing, with the left 344 view being to the viewer's left and the right 348 view being to the viewer's right.

In the example of FIG. 3, the data for the left 334, right 336, up 340, and bottom 342 views have been packed around the data for the back 338 view. Specifically, the left 334 view has been placed adjacent to the left edge of the back 338 view (which appears to be the right edge of the back 338 view, since the back 338 appears in mirror image here). Similarly, the right 336 view has been placed adjacent to the right edge of the back 338 view. The up 340 view has been packed above the back 338 view, and the bottom 342 view has been packed below the back 338 view. In some cases, the left 334, right 336, up 340, and bottom 342 data may be warped to fit into a square or rectangular data block. In various implementations, the size of the back 338 view can also be adjusted. For example, the back 338 view can be ¼ or ⅟₁₆ the size of the front 312 view. The combined left 334, right 336, up 340, bottom 342, and back 338 data can be packed into the frame packing structure 300 next to the data for the front 312, which is preserved at full resolution. Using this example frame packing structure 300, the data for a frame can be packed into a rectangular-shaped block of data.

Packing the left 334, right 336, up 340, and bottom 342 views according to their orientation to the back 338 view can provide a smooth transition between each view (e.g., from left to back, from back to right, from right to up, from up to left, etc.). For example, when a frame packed according to this example frame packing structure 300 is encoded, an encoding process may produce fewer distortions at the transitions between the views. To further reduce possible distortion, the frame packing structure 300 can be extended around the edges, so that additional, possibly duplicate video data can be packed around the outer edges of the frame packing structure 300. The extension to the frame packing structure 300 is illustrated in FIG. 3 by a dashed line.

Once packed as described above, the frame of video data can be processed for storage and/or transmission. For example, the frame can be encoded, compressed, and/or encapsulated. Each frame of virtual reality video data can be packed in a similar fashion, and the packed frames can be packed in sequence in a bitstream. The bitstream can be stored and/or transmitted.

Figure 4:
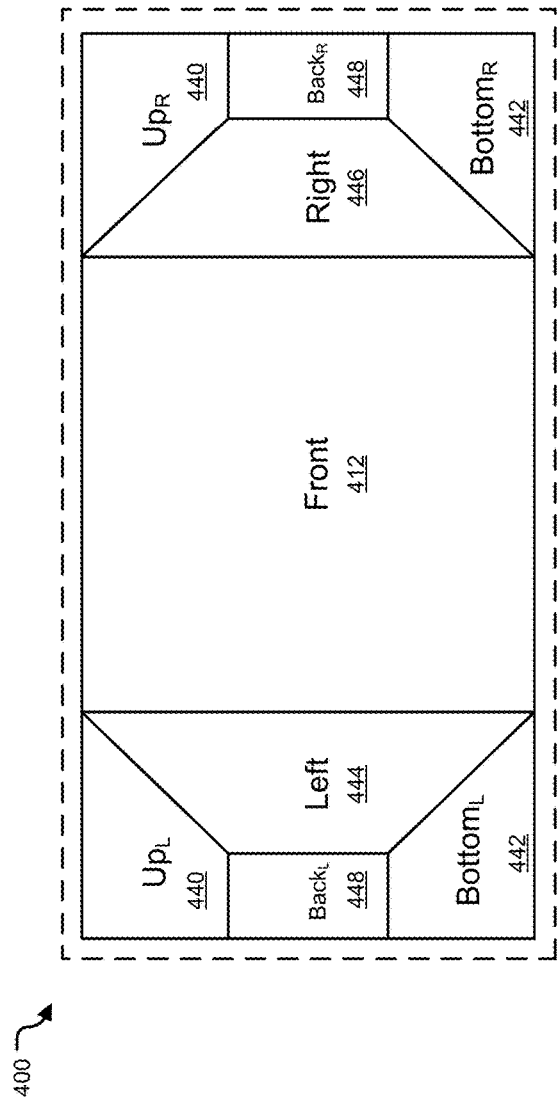
FIG. 4 is a diagram illustrating another example of a frame packing structure that can be used to store video data into a block of data that can stored and transported.

FIG. 4 illustrates another example of a frame packing structure 400 that can be used to store video data into a block of data that can be stored and transported. In this example, one half of each of the up 440 and bottom 442 views have been packed (possibly by warping the data) around one half of the back 448 view, along with either the left 444 view or the right 446 view. More specifically, the left half of the up 440 view ($Up_L$) and the left half of the bottom 442 view ($Bottom_L$) have been packed with the left 444 view around the left half of the back 448 view ($Back_L$), oriented according to their relative position to the back 448 view. Similarly, the right half of the up 440 view ($Up_R$) and the left half of the bottom 442 view ($Bottom_R$) have been packed with the right 446 view around the right half of the back 448 view ($Back_R$). So packed, the left 444 view is packed into the frame packing structure 400 adjacent to, and to the left of, the front 412 view. Similarly, the right 446 view is packed into adjacent to, and to the right of, the front 412 view. The front 412 view is preserved at full resolution.

While other packing methods are possible, in this example, the left 444 and right 446 views have been placed to the left and right, respectively, of the front 412 view for improving the continuity. In this example, encoding frame packing using the example frame packing structure 400 may produce fewer border distortions as the coding process crosses the borders between the left 444 and right 446 views and the front 412 view. Border artifacts can also be reduced by extending the edges of the frame packing structure 400, so that the edges of the frame include more video data. In FIG. 4, the extended edges are illustrated by a dashed line.

FIG. 3 and FIG. 4 provide just two examples of the ways in which a frame of video data, mapped to a truncated square pyramid shape can be packed into a frame for storage and/or transmission. The various views can be warped, split, and/or packed in different ways to meet different needs or priorities. For example, in some cases, left-to-right transitions are more important, while in other cases up-to-bottom transitions are more important. In various implementations, different frames from the same video steam can be packed in different ways. In these implementations, a bitstream generated from these frames may include identifiers to indicate how the frames were packed.

Figure 5:
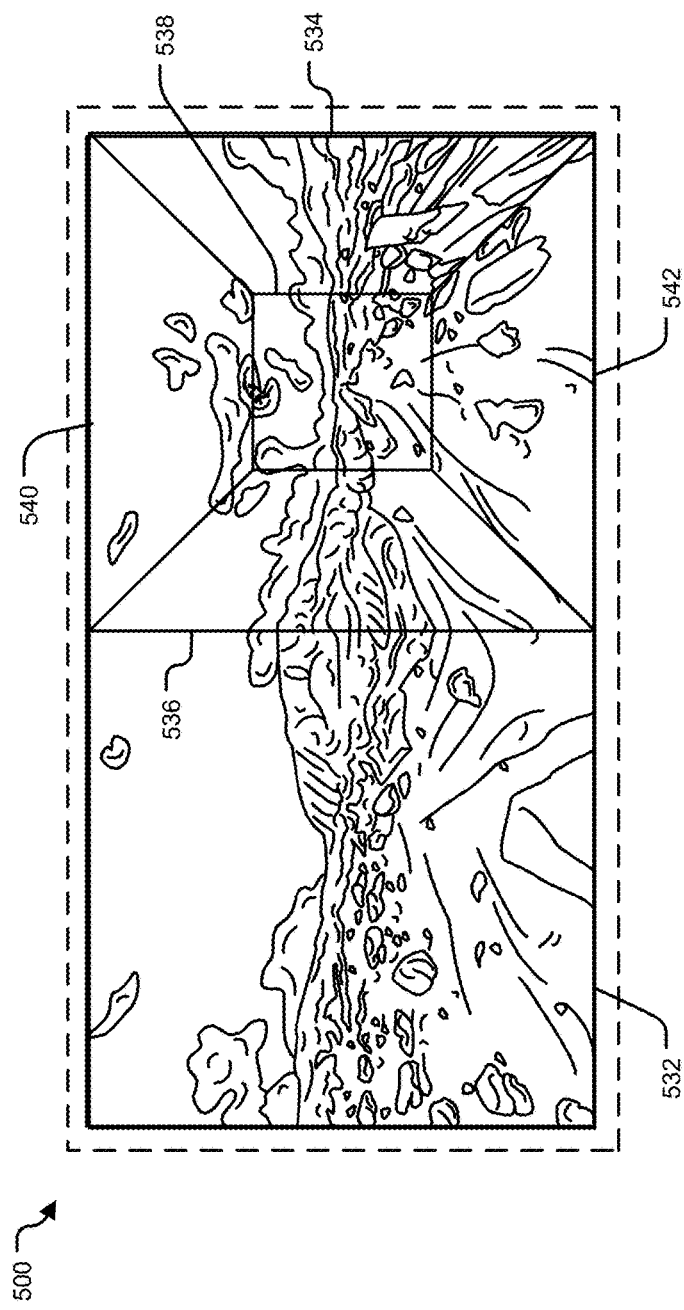
FIG. 5 is a diagram illustrating an example of a frame that has been packed according to the example frame packing structure illustrated in FIG. 3.

FIG. 5 illustrates an example of a video frame 500 that has been packed according to the example frame packing structure illustrated in FIG. 3. In the example of FIG. 5, a frame 500 of 360-degree video has been mapped to the planes of a truncated square pyramid. The data for each of the front 532, left 534, right 536, back 538, up 540, and back 542 views has then been packed according to the packing structure illustrated in FIG. 3. Specifically, in FIG. 5, the left 534, right 536, up 540, and bottom 542 views have been packed around the back 538 view according to their location with respect to the back 538 view. That is, the left 534 view is placed adjacent to the left edge of the back 538 view and the right 536 view is placed adjacent to the right edge of the back 538 view. Similarly, the up 540 view is placed adjacent to the upper edge of the back 538 view and the bottom 542 view is placed adjacent to the lower edge of the back 538 view. The combined left 534, right 536, back 538, up 540, and bottom 542 views are packed into the frame next to the front 532 view, which is packed into the frame 500 at full resolution.

Figure 6:
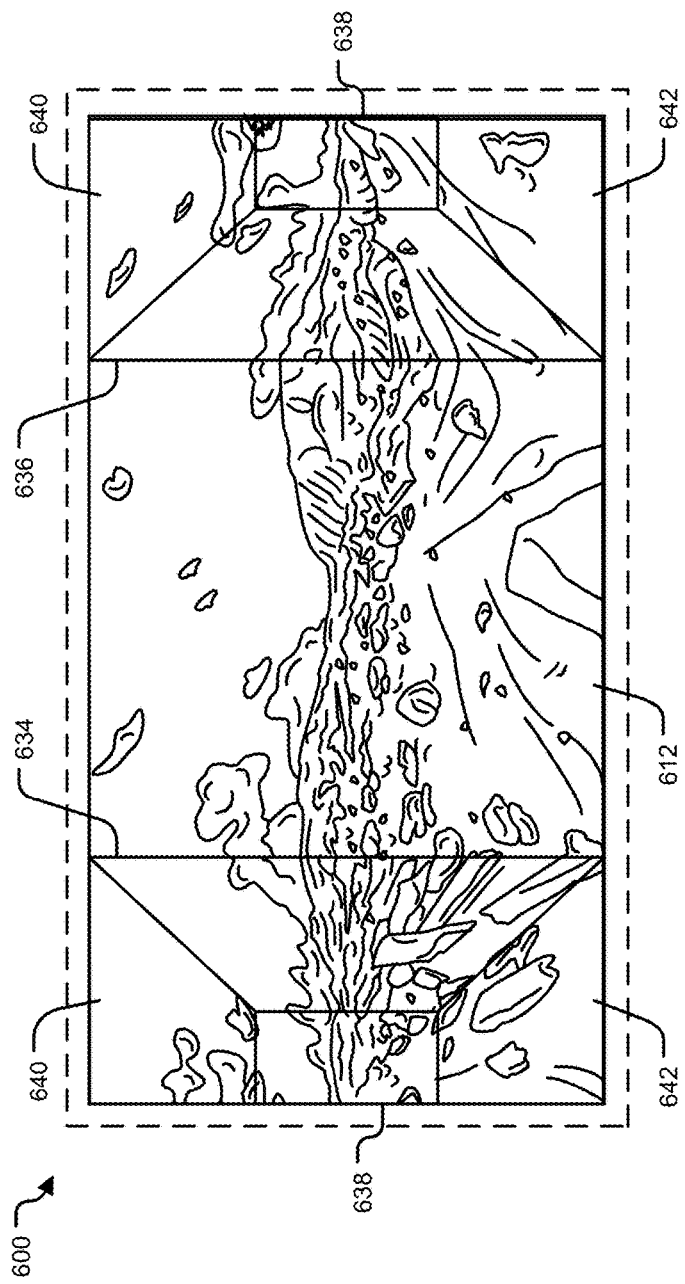
FIG. 6 is a diagram illustrating an example of a video frame that has been packed according to the example frame packing structure illustrated in FIG. 4.

FIG. 6 illustrates an example of a video frame 600 that has been packed according to the example frame packing structure illustrated in FIG. 4. In the example of FIG. 6, the frame 600 of 360-degree video has been mapped to the planes of a truncated square pyramid. In this example, the data for the left 634, right 636, up 640, and bottom 642 views have been packed around the back 638 view, and the resulting data has been divided in half. The halves have further been packed into the video frame 600 adjacent to the front 612 view. Specifically, the left half of the up 640 view and the left half of the bottom 642 view has been packed, along with the left 634 view, around the left half of the back 638 view. The combined "left" views are then packed into the video frame 600 so that the left 634 view is adjacent to the left edge of the front 612 view, which is packed at full resolution. Similarly, the right half of the up 640 view and the right half of the bottom 642 view have been packed, along with the right 636 view, around the right half of the back 638 view. The combined "right" views are then packed into the video frame 600 so that the right 636 view is adjacent to the front 612 view. The resulting packed video frame 600 may provide better horizontal transitions as the viewport moves horizontally.

Figure 7:
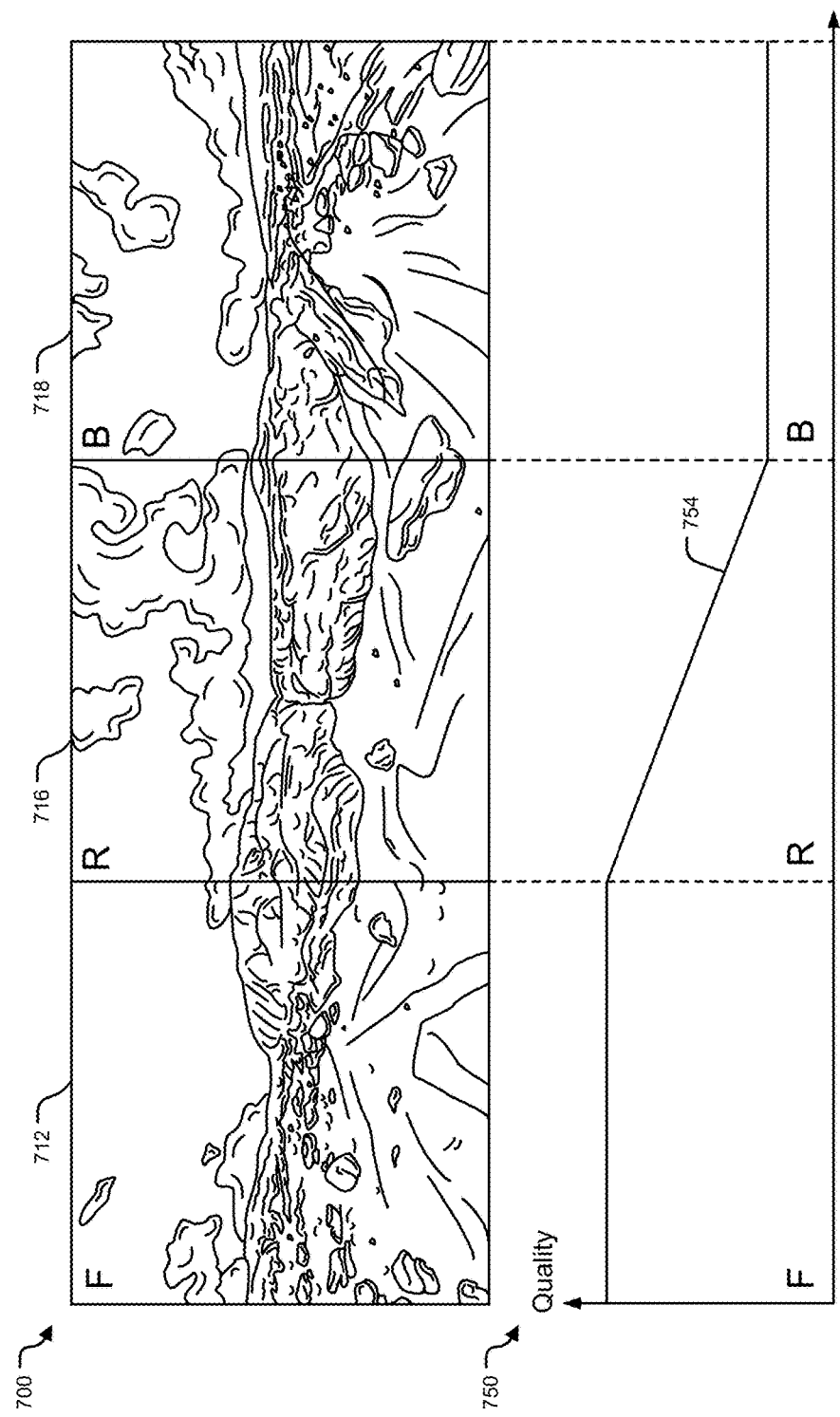
FIG. 7 is a graph illustrating an example of the measure of quality seen when a video frame has been packed according to a truncated square pyramid geometry.

Regardless of the frame packing structure used, the truncated square pyramid mapping may provide smoother transitioning of quality from the front view to the back view. FIG. 7 illustrates a graph, which provides an example of the measure of quality 750 seen when a video frame 700 has been packed according to a truncated square pyramid geometry. In this example, the graph illustrates the quality 750 detectable as a frame 700 is viewed from the front 712 view to the right 716 view to the back 718 view. A transition from front 712 to right 716 to back 718 is provided as an example, and the quality 750 change would apply also to a transition from front to left to back, front to up to back, and front to bottom to back.

In the graph illustrated in FIG. 7, quality 750 is measured as a noticeable change in image, which may be due, for example, to a change in image resolution. The graph's horizontal axis illustrates the change in quality 750 as the view is updated. The line 754 of the graph illustrates the detectable quality 750 when the frame 700 is mapped according to the truncated square pyramid. As illustrated, the line 754 illustrates that a gradual change in quality 750 may be noticed as the view transitions from front 712 to right 716. Furthermore, a consistent, though lower, quality 750 may be noticed in the back 718 view. Thus, a truncated square pyramid mapping may provide a more seamless and realistic viewing experience.

The graph illustrates one example of the transition in quality that may be seen when a video frame is mapped and packed as discussed herein. In other examples, the transitions in the line 754 may vary, depending on whether the video frame was mapped using a truncated square pyramid shape, a cube shape, or some other shape, as well as the method used to pack the pixels in the video frame into the selected shape.

Figure 8:
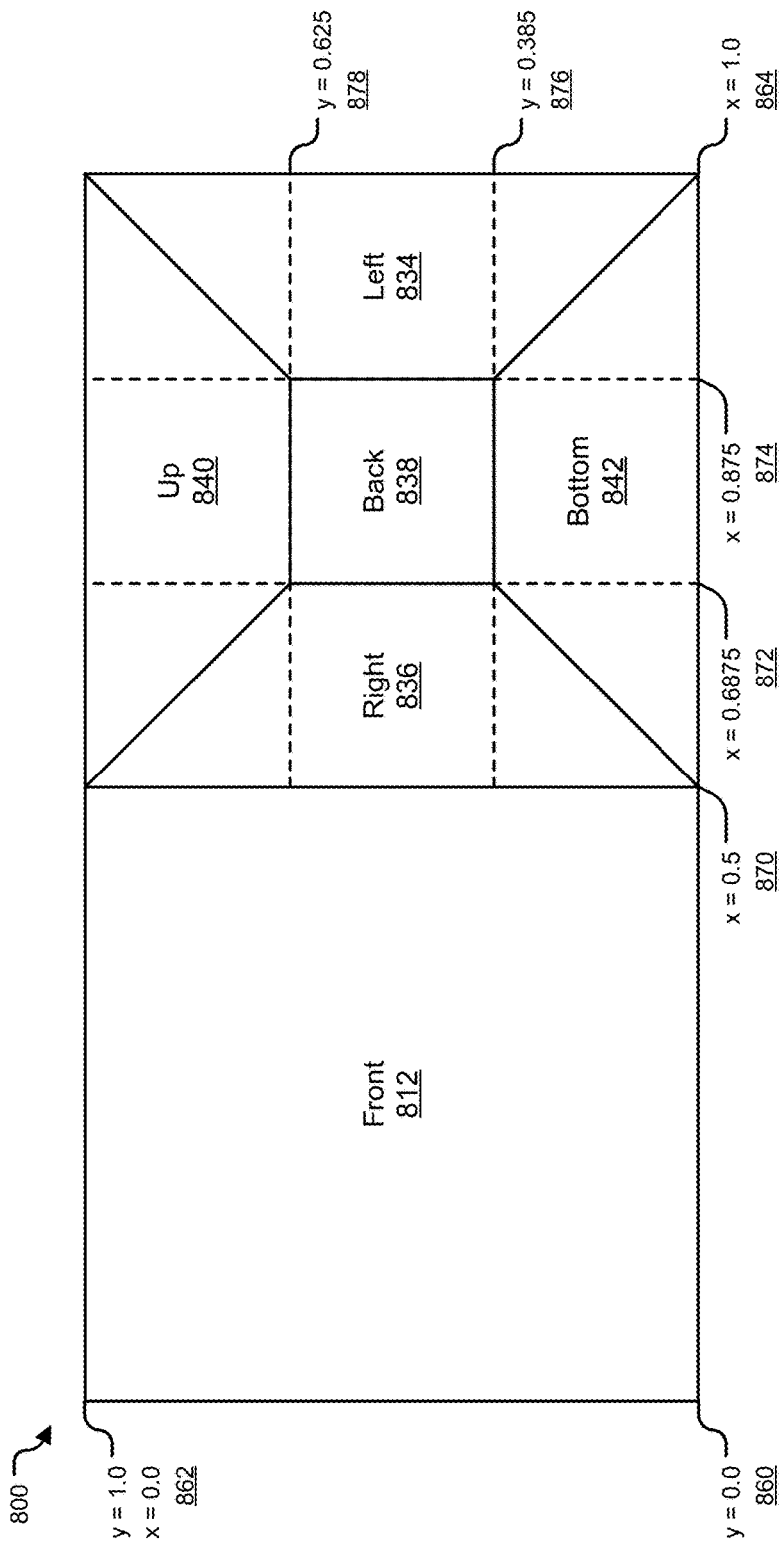
FIG. 8 is a diagram illustrating an example of ratios that can be used to map the faces of a cube-shaped representation of 360-degree video data into a frame packing structure for a truncated-square pyramid representation of the video data.

FIG. 8 illustrates an example of ratios that can be used to map the faces of a cube-shaped representation of 360-degree video data into a frame packing structure 800 for a truncated-square pyramid representation of the video data. Video data packed into cube faces can be warped directly onto the trapezoid-shaped planes of the truncated square pyramid, using the example equations below. The video data for the back face can be warped into a small square, according to the example equation below.

In the example of FIG. 8, the lower left corner 860 has been designated as coordinate (0, 0) for the frame packing structure 800. In various implementations, another point (e.g., the upper left corner 862, the horizontal mid-point 870 of the bottom edge, etc.) in the frame packing structure 800 can be designated as coordinate (0, 0). The upper left corner 862 of the frame packing structure 800 has been designated as coordinate (0, 1). The value of "1" in this example does not indicate a size of a frame packed according to the frame packing structure 800, but rather a ratio within the frame packing structure 800 with respect to coordinate (0, 0). The actual size of the frame may be, for example, 1024 pixels high by 2048 pixels wide, hence the upper left corner 862 of the frame packing structure may be pixel location (0, 1023). The lower-right corner 864 of the frame packing structure 800 is similarly designated as coordinate (1, 0), indicating that the lower-right corner 864 includes the left-most edge of the frame packing structure 800.

In this example, a mid-point 870 of the horizontal axis of the frame packing structure 800 has been designated as x=0.5. The ratio of "0.5" indicates that this mid-point 870 is exactly the middle of the frame packing structure 800, such that the left half of the frame packing structure 800 stores as much data as the right half. Additionally, a first horizontal point 872 has been designated as x=0.6875 (that is, x=0.5+0.3875) and a second horizontal point 874 has been designated as x=0.875 (that is, x=0.5+0.625). The first 872 and second 874 horizontal points indicate, in this example, the width of the data for the back 838 view. Since the data for the back 838 view is square in shape, a first vertical point 876 has been designated as y=0.385 and y=0.625.

The ratios provided in FIG. 8 illustrate one example of the ratios that can be used to define the packing of video data into a frame packing structure. The front face 812 is from x=0.0 to x=0.5, and from y=0.0 to y=1.0. In various implementations, other ratios can be used. For example, in some cases, it may be desirable to reduce or increase the size of the back 838 view. Such an example is discussed with respect to FIG. 13.

Using the example ratios illustrated in FIG. 8, the coordinates (x', y') that map a point in the right cube face to the right 836 view in the frame packing structure 800 can be determined using the following equation:

$$x' = \frac{x - 0.5}{0.1875} \qquad y' = \frac{y - 2.0x + 1.0}{3.0 - 4.0x}$$

Similarly, the coordinates (x', y') that map a point in the left cube face to the left 834 view in the frame packing structure 800 can be determined using the following equation:

$$x' = \frac{x - 0.8125}{0.1875} \qquad y' = \frac{y + 2.0x - 2.0}{4.0x - 3.0}$$

The coordinates (x', y') that map a point in the bottom cube face to the bottom 842 view in the frame packing structure 800 can be determined using the following equation:

$$x' = \frac{1.0 - x - 0.5y}{0.5 - y} \qquad y' = \frac{0.375 - y}{0.375}$$

The coordinates (x', y') that map a point in the top cube face to the up 840 view in the frame packing structure 800 can be determined using the following equation:

$$x' = \frac{0.5 - x + 0.5y}{y - 0.5} \qquad y' = \frac{1.0 - y}{0.375}$$

Mapping from the frame packing structure back to the faces of a cube can also occur. For example, a decoding device that receives a frame packed according to the frame packing structure may unpack the video data in the frame prior to processing the data. The coordinates (x, y) in the right cube face can be obtained using the following equation:

$$x=0.1875x'+0.5$$

$$y=0.375x'-0.75x'y'+y'$$

The coordinates (x, y) in the left cube face can be obtained using the following equation:

$$x=0.1875x'+0.8125$$

$$y=0.25y'+0.75x'y'-0.375x'+0.375$$

The coordinates (x, y) in the bottom cube face can be obtained using the following equation:

$$x=0.1875y'-0.375x'y'-0.125x'+0.8125$$

$$y=0.375-0.375y'$$

The coordinates (x, y) in the top cube face can be obtained using the following equation:

$$x=1.0-0.1875y'-0.5x'+0.375x'y'$$

$$y=1.0-0.375y'$$

Figure 9C:
FIG. 9A-FIG. 9D are diagrams illustrating an example of a comparison between the frame sizes that result from various different mappings for a 360-degree video frame.
Figure 9D:
Figure 9A:
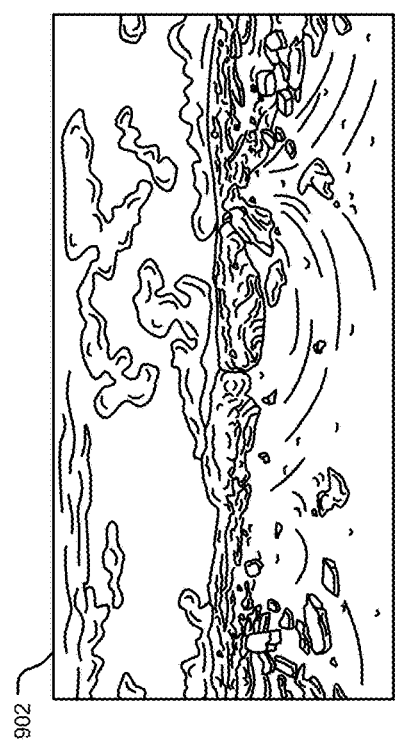
Figure 9B:
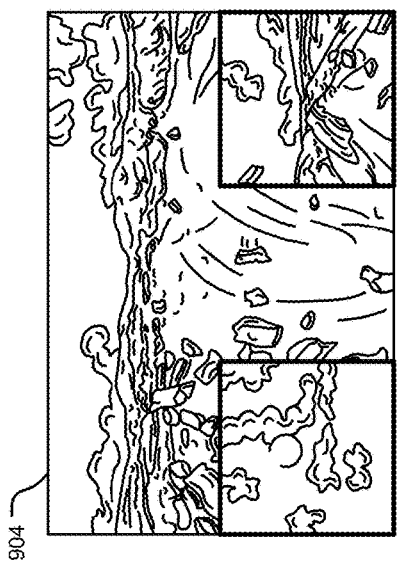

FIG. 9A-FIG. 9D illustrates a comparison between the frame sizes that result from various different mappings for a 360-degree video frame. To provide this comparison, the example mappings in FIG. 9A-FIG. 9D are drawn to scale with respect to each other. Each example mapping maps the same video frame (that is, the same number of pixels), using their respective mapping methods. The example mappings illustrated in FIG. 9A-FIG. 9D include an equirectangular 902 mapping (FIG. 9A), a cubic 904 mapping (FIG. 9B), and two examples of a truncated square pyramid 906, 908 mapping (FIG. 9C and FIG. 9D).

As discussed above, the equirectangular 902 mapping can include all of the pixels in a particular frame, and thus may be considered a full frame. In this example, the equirectangular 902 mapping is four thousand pixels wide and two thousand pixels high, thus containing a total of eight million pixels. Further, only one representation is needed for one frame, since all the pixels in the frame are available at full resolution.

The cubic 904 map is slightly smaller than the equirectangular 902 map. The cube shape, however, has less distortion in the up and bottom views. The cubic 904 map, in this example, is three thousand pixels wide and two thousand pixels high, thus containing six million pixels. In this example, the left, front, and right cube faces have been packed next to each other in the frame. The up, bottom, and back faces have also been packed next to each other, below the left, front, and right views. As with the equirectangular 902 mapping, all of the pixels in the frame are available at full resolution, so only one representation is needed for the frame. While the cubical 904 map is smaller than the equirectangular 902 map, a decoder device may have to do more work to stitch the parts of the frame together into their respective positions.

The first truncated square pyramid 906 mapping is based on the frame packing structure illustrated in FIG. 3 and FIG. 5. The example truncated square pyramid 906 mapping of FIG. 9 is two thousand pixels wide and one thousand pixels high, thus containing two million pixels. The truncated square pyramid 906 mapping provides full resolution for one view or viewport, and reduced resolution for all other views. Hence, in some cases, six representations may be encoded for one frame, with each of the six representations being encoded at a 90-degree angle to each other. Whether all six representations are needed, however, may depend on the contents of the frame, and/or which viewport a viewer is looking at any given moment.

The second truncated square pyramid 908 mapping is based on the frame packing structure illustrated in FIG. 4 and FIG. 6. This example truncated square pyramid 908 mapping of FIG. 9 is also two thousand pixels wide and one thousand pixels high, thus containing two million pixels. The example truncated square pyramid 908 also provides full resolution for one view, and reduce resolution for all other views.

In various implementations, a file format can describe 360-degree video frames. FIG. 4 and FIG. 6 illustrate frame packing structures that can be used to pack a 360-degree video frame that has been mapped to a truncated square pyramid shape into a rectangular representation. In various implementations, a file format can contain parameters for mapping the 360-degree video to the truncated square pyramid geometry. The file format can further contain parameters for describing the video data, so mapped, into a text and/or binary file. The file can be stored and/or transported.

First Example Embodiment

In some implementations, the techniques described herein can extend the omnidirectional media application format proposed in ISO/IEC JTC1/SC29/WG11/M37837, "Proposed text for omnidirectional media application format", MPEG 114, February 2016, or ISO/IEC JTC1/SC29/WG11 N16189, "WD on ISO/IEC 23000-20 Omnidirectional Media Application Format," MPEG 115, June 2016 (hereinafter collectively "Omnidirectional Media Application Format Standard") with the truncated square pyramid (tspyr) geometry. The implementations described below include proposed additions to syntax and semantics and are detailed with reference to the Omnidirectional Media Application Format Standard.

In the first example embodiment discussed below, text from the Omnidirectional Media Application Format Standard is quoted, with additions to the text shown with underlined text (example of additional text).

In some implementations, changes to the Omnidirectional Media Application Format Standard include omnidirectional media texture mapping metadata sample entries. One example is provided as follows:

Syntax

The following changes are proposed additions to section 3.2.2 in the Omnidirectional Media Application Format Standard:

```
aligned(8) class OmnidirectionalMediaTextureMappingSampleEntry
extends MetadataSampleEntry ('omtm'){
    unsigned int(1)           is_stereoscopic;
    unsigned int(1)           is_default_front;
    unsigned int(6)           reserve
    if ( is_sterestopic )
        unsigned int(8)                   stereoscopic_type;
    unsigned int(8)           geometry_type;
    if ( geometry_type == tspyr ) {
        unsigned int(8) tspyr_height;
        unsigned int(8) tspyr_back_width;
        unsigned int(8) tspyr_back_height;
    }
    if ( !is_default_front) {
        unsigned int(16)center_pitch;
        unsigned int(16)center_yaw;
    }
}
```

Semantics

The changes in the table below and the semantic definitions following the table include proposed additions to Table 3 in section 3.2.3 of the Omnidirectional Media Application Format Standard.

TABLE

| Omnidirectional media geometry type | |
|---|---|
| Value | geometry_type |
| 0x00 | reserved |
| 0x01 | Sphere |
| 0x02 | Squished Sphere |
| 0x03 | Cylinder |
| 0x04 | Cube |
| 0x05 | Pyramid |
| 0x06 | Truncated Square Pyramid |
| 0x07-0xFF | reserved | tspyr_height indicates the height or depth of truncated square pyramid; for example, the height or depth can be specified with respect to the size of the front of the truncated square pyramid.

tspyr_back_width and tspyr_back_height indicates the width and height of the back face; for example, the width and height of the truncated square pyramid can be specified with respect to the size of the front of the truncated square pyramid.

In some implementations, another example of changes to the Omnidirectional Media Application Format Standard including omnidirectional media texture mapping metadata sample entries is provided as follows:

Syntax

The following changes are proposed updates to section 3.3.1 in the Omnidirectional Media Application Format Standard:

```
aligned(8) class OmniMediaTextureMappingMetadataSample( ){
    unsigned int(16) center_pitch_offset;
    unsigned int(16) center_yaw_offset;
    if (geometry_type != sphere){
        unsigned int(1) is_multiple_regions;
        unsigned int(8) num_of_regions;
        for(i=0; i < number_regions ; i++){
            unsigned int(16) region_top_left_x;
            unsigned int(16) region_top_left_y;
            unsigned int(16) region_width;
            unsigned int(16) region_height;
            if (geometry_type == ...){
                ...
            } else if (geometry_type == tspyr){
                unsigned int(16) tspyr_surface_id;
                if (tspyr_surface_id == tspyr_surface_id) {
                    unsigned int(16) area_top_left_x;
                    unsigned int(16) area_top_left_y;
                    unsigned int(16) area_width;
                    unsigned int(16) area_height;
                }
            }
        }
    }
}
```

Semantics

The changes below include proposed updates to the semantics in section 3.3.2 of the Omnidirectional Media Application Format Standard:

tspyr_surface_id indicates the identifier of the surface of the truncated square pyramid as defined in the "Definitions" section of this document.

TABLE

| Identifier of tspyr surface | |
|---|---|
| Value | tspyr_surface_id |
| 0x00 | Reserved |
| 0x01 | Front |
| 0x02 | Top |
| 0x03 | Bottom |
| 0x04 | Left |
| 0x05 | Right |
| 0x06 | Back |
| 0x07-0xFF | Reserved |

Definitions

Various definition of geometry types, texture mapping, and projection are now described.

Figure 10A:
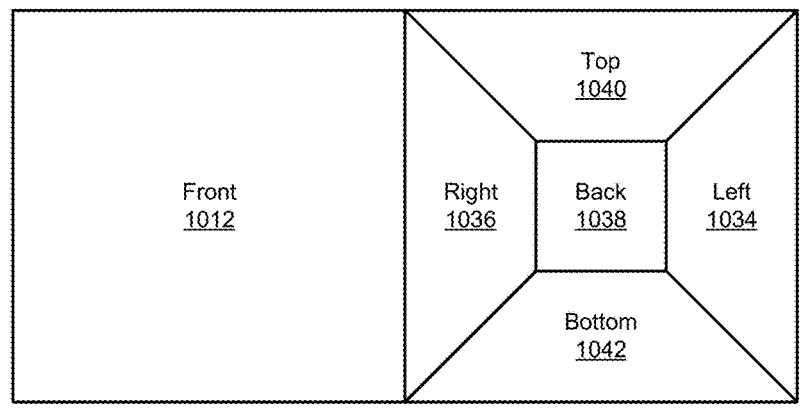
FIG. 10A and FIG. 10B are diagrams illustrating the correspondence between the texture regions and the faces of the truncated square pyramid geometry.
Figure 10B:
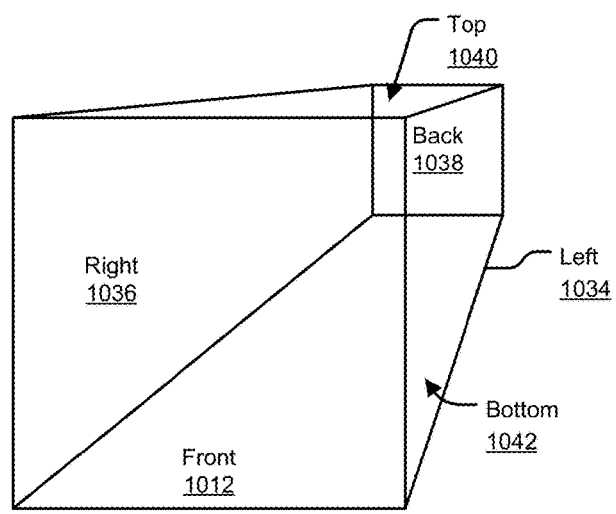

With respect to a Truncated Square Pyramid (TSP), the regions of the texture to be mapped to each surface of the TSP 3-D geometry are arranged as shown in FIG. 10A and FIG. 10B. In particular, FIG. 10A and FIG. 10B illustrate the correspondence between the texture regions and the faces (front 1012, back 1038, left 1034, right 1036, top 1040, and bottom 1042) of the tspyr geometry. The location and size of each region is indicated by an OmniMediaTextureMapping-MetadataSample box. The location (e.g., (region_top_left_x, region_top_left_y)) 1150, width (e.g., region_width) 1152, and height (e.g., region_height) 1154 of each region is indicated in FIG. 11A-FIG. 11F.

As provided by FIG. 11A, if tspyr_surface_id is equal to front 1112, the front 1112 surface area is the left half of the texture rectangle. The surface area is given by the region_width 1152 and region_height 1154. In various implementations, the region_width 1152 and region_height 1154 can be defined in terms of the height or depth of the truncated square pyramid.

As provided by FIG. 11B, if tspyr_surface_id is equal to back 1138, the back surface area is located in the right half of the texture rectangle. The surface area is given by the region_width 1152 and region_height 1154. In various implementations, the region_width 1152 and region_height 1154 can be defined in terms of the width and height of the back face.

As provided by FIG. 11C, if the tspyr_surface_id is equal to top 1140, the surface area is located at the top of the right half of the texture rectangle. The surface area is given by the region_width 1152 and region_height 1154. In various implementations, the region_width 1152 and region_height 1154 can be defined in terms of the height or depth of the truncated square pyramid, as well as the width and height of the back face.

As provided by FIG. 11D, if the tspyr_surface_id is equal to bottom 1142, the surface area is located at the bottom of the right half of the texture rectangle. The surface area is given by the region_width 1152 and region_height 1154. In various implementations, the region_width 1152 and region_height 1154 can be defined in terms of the height or depth of the truncated square pyramid, as well as the width and height of the back face.

As provided by FIG. 11E, if the tspyr_surface_id is equal to right 1136, the surface area is located on the left side of the right half of the texture rectangle. The surface area is given by the region_width 1152 and region_height 1154. In various implementations, the region_width 1152 and region_height 1154 can be defined in terms of the height or depth of the truncated square pyramid, as well as the width and height of the back face.

As provided by FIG. 11F, if the tspyr_surface_id is equal to left 1134, the surface area is located on the right side of the right half of the texture rectangle. The surface area is given by the region_width 1152 and region_height 1154. In various implementations, the region_width 1152 and region_ height 1154 can be defined in terms of the height or depth of the truncated square pyramid, as well as the width and height of the back face.

Second Example Embodiment

In some implementations, the techniques described herein extend upon the omnidirectional media application format proposed in N15946 with the truncated square pyramid geometry. In the text below, additions to MPEG N15946 are indicated with underlined text (example of additional text).

The truncated square pyramid (tspyr) geometry is proposed for directional viewport rendering of VR/360 degree video. The front face of tspyr has full resolution while the resolution gradually reduces towards the smaller back face. As noted above, FIG. 10A and FIG. 10B illustrate the correspondence between the texture regions and the faces (front 1012, back 1038, left 1034, right 1036, top 1040, and bottom 1042) of the tspyr geometry. FIG. 10A illustrates the truncated square pyramid geometry and FIG. 10B illustrates the corresponding texture regions.

The tspyr Video Information may be signalled in the Tspyr Video Information box, which is contained in the VR Video Information box, as described in ISO/IEC JTC1/SC29/WG11/N15946 "Technologies under Consideration for Omnidirectional Media Application Format", MPEG 114, February 2016. The syntax and semantics of the Tspyr Video Information box are described as follows:

Syntax

```
aligned(8) class VrVideoBox extends FullBox('vrvd', version = 0, 0) {
    template unsigned int(28) reserved = 0;
    unsigned int(4)  vr_mapping_type;
    if (vr_mapping_type == 3)
        TspyrVideoInfoBox tspyr_video_info_box;
    Box[ ] any_box; // optional
}
```

Semantics vr_mapping_type is an integer that indicates the mapping type from the spherical video to the rectangular format. A zero value indicates the equi-rectangular map. A value one indicates the cube map. A value three indicates the truncated square pyramid map, and the format is described by the TspyrVideoInfoBox. Other values are reserved.

The syntax and semantics of the Tspyr Video Information box (TspyrVideoInfoBox) are as follows:

Box Type: 'tspyr'

Container: Scheme Information box ('vrvd')

Mandatory: Yes (when vr_mapping_type is equal to 3)

Quantity: One

The Tspyr Video Information box is used to indicate the format of the tspyr VR/360 video contained in the track. The information is to be used for rendering of the tspyr VR/360 video.

```
aligned(8) class TspyrVideoInfoBox extends FullBox('tspyr', version = 0, 0) {
    bit(8) reserved = 0;
    unsigned int(8) tspyr_depth;
    unsigned int(8) tspyr_back_width;
    unsigned int(8) tspyr_back_height;
    unsigned int(16) center_pitch;
    unsigned int(16) center_yaw;
    unsigne int(16) center_pitch_offset;
    unsigned int(16) center_yaw_offset;
    unsigned int(16) area_width;
    unsigned int(16) area_height;
    for (tspyr_region_id = 0; tspyr_region_id < 6; tspyr_region_id++)
    {
        unsigned int(32) region_top_left_x;
        unsigned int(32) region_top_left_y;
        unsigned int(32) region_width;
        unsigned int(32) region_height;
    }
}
``` tspyr_depth indicates the depth of the truncated square pyramid.

tspyr_back_width and tspyr_back_height indicates the width and height of the back face.

tspyr_region_id indicates the identifier of the region of the tspyr texture (Table 1).

TABLE 1

Identifier of tspyr region

| Value | tspyr_region_id |
|---|---|
| 0x00 | Front |
| 0x01 | Back |
| 0x02 | Top |
| 0x03 | Bottom |
| 0x04 | Left |
| 0x05 | Right | center_pitch and center_yaw indicate respectively the pitch and yaw angles of the coordinate of the point to which the center pixel of the video is rendered. The center pixel is the center of the front face of the truncated square pyramid. The pitch and yaw determine the viewport, meaning the orientation of the truncated square pyramid. When not present, the values of center_pitch and center_yaw are inferred to be equal to 0.

center_pitch_offset and center_yaw_offset indicate respectively the offset values from the pitch and yaw angles of the coordinate of the point to which the center pixel of the video is rendered. center_pitch_offset+center_pitch and center_yaw_offset+center_yaw indicate respectively the center point of the current sample.

region_top_left_x and region_top_left_y indicate respectively the horizontal and vertical coordinate of the top-left corner of the region of the video in the referenced track in rectangular shape.

region_width and region_height indicate respectively the width and height of the region of the video in the referenced track in rectangular shape.

The regions of the texture to be mapped to each surface of the 3-D geometry are arranged as in FIG. 11A-FIG. 11D. The location 1150 (e.g., (region_top_left_x, region_top_left_y)), width 1152 (e.g. region_width) and height 1154 (e.g., region_height) of each region is indicated.

As provided by FIG. 11A, if tspyr_region_id is equal to front 1112, the front 1112 surface area is the left half of the texture rectangle. The surface area is given by the region_width 1152 and region_height 1154. In various implementations, the region_width 1152 and region_height 1154 can be defined in terms of the depth of the truncated square pyramid.

As provided by FIG. 11B, if tspyr_region_id is equal to back 1138, the back 1138 surface area is located in the right half of the texture rectangle. The surface area is given by the region_width 1152 and region_height 1154. In various implementations, the region_width 1152 and region_height 1154 can be defined in terms of the width and height of the back face.

As provided by FIG. 11C, if the tspyr_region_id is equal to top 1140, the surface area is located at the top of the right half of the texture rectangle. The surface area is given by the region_width 1152 and region_height 1154. In various implementations, the region_width 1152 and region_height 1154 can be defined in terms of the depth of the truncated square pyramid, as well as the width and height of the back face.

As provided by FIG. 11D, if the tspyr_region_id is equal to bottom 1142, the surface area is located at the bottom of the right half of the texture rectangle. The surface area is given by the region_width 1152 and region_height 1154. In various implementations, the region_width 1152 and region_ height 1154 can be defined in terms of the depth of the truncated square pyramid, as well as the width and height of the back face.

As provided by FIG. 11E, if the tspyr_region_id is equal to right 1136, the surface area is located on the left side of the right half of the texture rectangle. The surface area is given by the region_width 1152 and region_height 1154. In various implementations, the region_width 1152 and region_ height 1154 can be defined in terms of the depth of the truncated square pyramid, as well as the width and height of the back face.

As provided by FIG. 11F, if the tspyr_region_id is equal to left 1134, the surface area is located on the right side of the right half of the texture rectangle. The surface area is given by the region_width 1152 and region_height 1154. In various implementations, the region_width 1152 and region_ height 1154 can be defined in terms of the depth of the truncated square pyramid, as well as the width and height of the back face.

Figure 12:
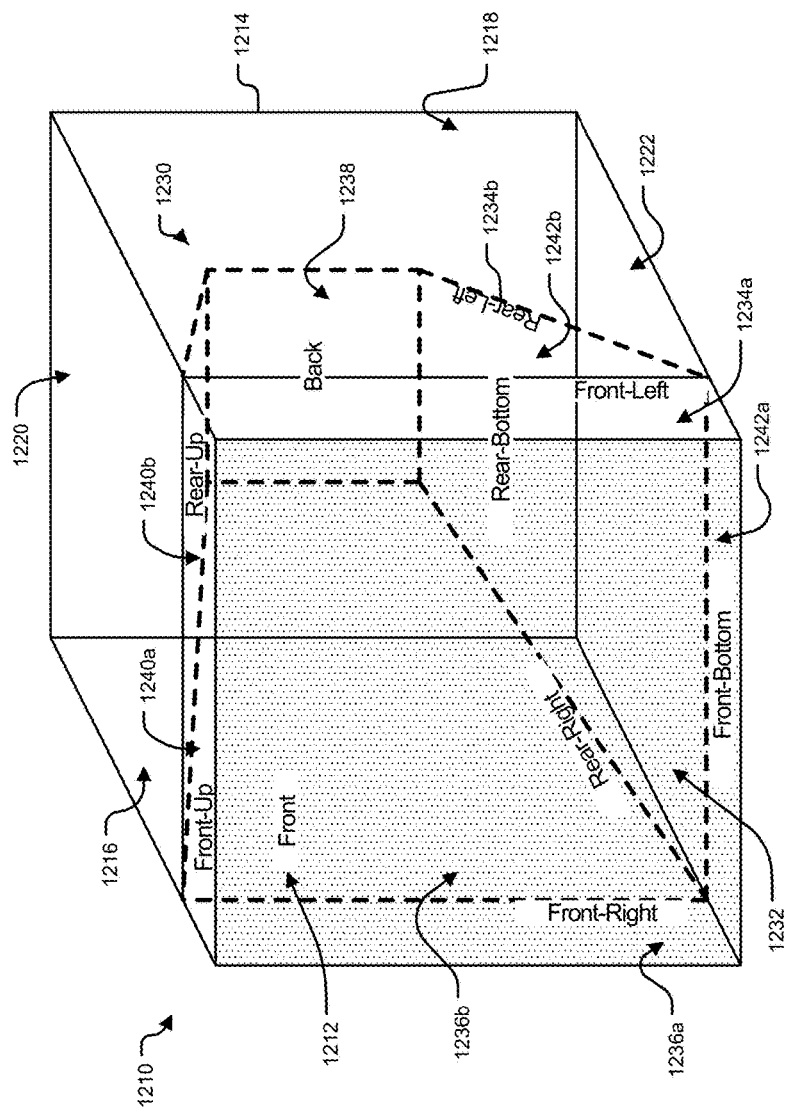
FIG. 12 is a diagram illustrating another example of mapping the planes of a cube to the planes of a truncated square pyramid.

FIG. 12 illustrates another example of mapping the planes of a cube 1210 to the planes of a truncated square pyramid 1230. As discussed above, a spherical representation of a virtual environment can be mapped to the six planes provided by the faces of a cube 1210. One face of the cube 1210 can be designated as the front 1212 view, the face to the left of the front 1212 as the left 1214 view, the face to the right of the front 1212 the right 1216 view, a corresponding face as the up 1220 view, another as the bottom 1222 view, and the last as the back 1218 view. The mapping of the spherical data set to the faces of the cube 1210 provide a full frame of video data, since each of six possible views are preserved at full resolution. As also discussed above, mapping the planes provided by the cube 1210 to the planes provided by a truncated square pyramid may reduce the amount of data needed to represent a full 360 degrees of view.

In the example of FIG. 12, a modified truncated square pyramid 1230 is used to provide planes to which to map the data in the faces of the cube 1210. In this example, the truncated square pyramid 1230 has been modified to add a base or raised platform to the base of the truncated square pyramid. Put another way, in this example, the base of the truncated square pyramid 1230 has been oriented towards the front 1212 face of the cube, but has been offset in the direction of the back 1218 face of the cube by some amount.

Thus, for example, the left side of the truncated square pyramid 1230 includes a rectangular front-left 1234a plane and a trapezoidal rear-left 1234b plane. The front-left 1234a plane corresponds directly to the corresponding region of the left 1214 cube face, and thus the pixels in the front-left 1234a plane are preserved at full resolution. The pixels in the rear-left 1234b plane can be reduced from full resolution to fit into the trapezoid shape of the plane.

Each of the right 1216, up 1220, and bottom 1222 faces of the cube can be mapped in a similar way to the planes provided by the modified truncated square pyramid. Specifically, the truncated square pyramid 1230 includes a front-right 1236a plane that preserves pixels at full resolution, and a rear-right 1236b plane that reduces the resolution. Similarly, the truncated square pyramid 1230 includes a front-up 1240a plane and a rear-up 1240b plane, as well as a front-bottom 1242a plane and rear-bottom 1242b plane. The back 1238 plane of the truncated square pyramid 1230 is unmodified, and provides a reduced resolution representation of all of the back 1218 face of the cube 1210. The front 1212 face of the cube is further mapped, at full resolution, to the modified base 1232 of the truncated square pyramid 1230.

The modified truncated square pyramid 1230 mapping described above may provide a better 90-degree field of view to a viewer looking towards the front 1212 face of the cube 1210. In addition to the front 1212 view being preserved at full resolution, an amount of the left 1214, right 1216, up 1220, and bottom 1222 views are also preserved at full resolution. The amount of the left 1214, right 1216, up 1220, and bottom 1222 views that are preserved at full resolution may be well within the viewer's peripheral vision, or may be just at the edge of the viewer's vision. In various implementations, the field of view provided to the viewer can be adjusted by modifying the size of the front-left 1234a, front-right 1236b, front-up 1240a, and front-bottom 1240b regions. This adjustment can be accomplished, for example, by modifying the size of the top 1238 plane of the truncated square pyramid 1230.

Figure 13:
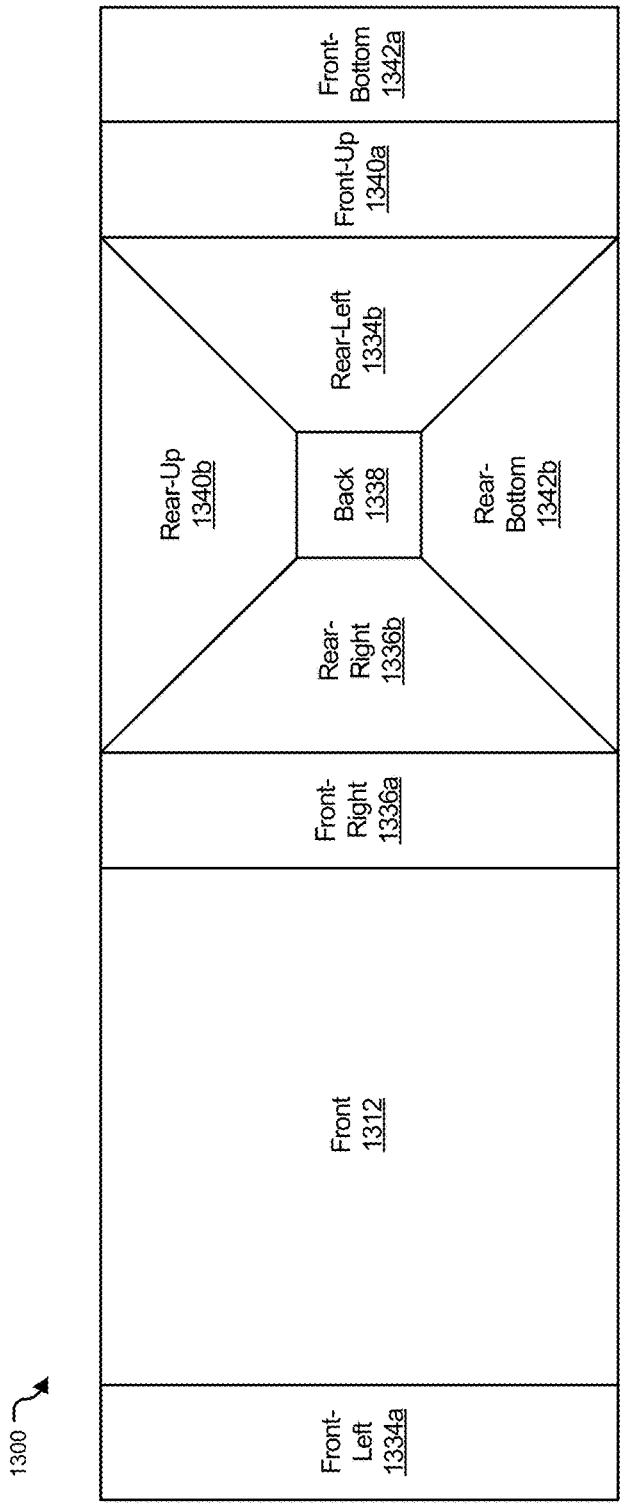
FIG. 13 is a diagram illustrating an example of a frame packing structure for the modified truncated square pyramid mapping.

FIG. 13 illustrates an example of a frame packing structure 1300 for the modified truncated square pyramid mapping. In this example, the front-left 1334a view has been packed into the frame packing structure 1300 to the left of the front 1312 view, and the front-right 1336a view has been packed to the right of the front 1312 view. Placing the front-left 1334a and front-right 1336a into the frame packing structure 1300 in their respective positions next to the front 1312 may provide a smoother transition from front to left or front to right as the frame packing structure 1300 is encoded.

As further illustrated in this example, the rear-left 1334b, rear-right 1336b, rear-up 1340b and rear-bottom 1342b views have been packed into the frame packing structure 1300 around the back 1338 view. The combination of the rear-left 1334b, rear-right 1336b, rear-up 1340b, rear-bottom 1342b, and back 1338 are then packed into the frame packing structure 1300 next to the front-right 1336a, so that the rear-right 1336b is adjacent to the front-right 1336a view. The front-up 1340a view is rotated and packed next to the rear-left 1334b view. The front-bottom 1342a is also rotated and placed next to the front-up view 1340a. The end result is that, in this example, the frame packing structure 1300 is rectangular.

Figure 14:
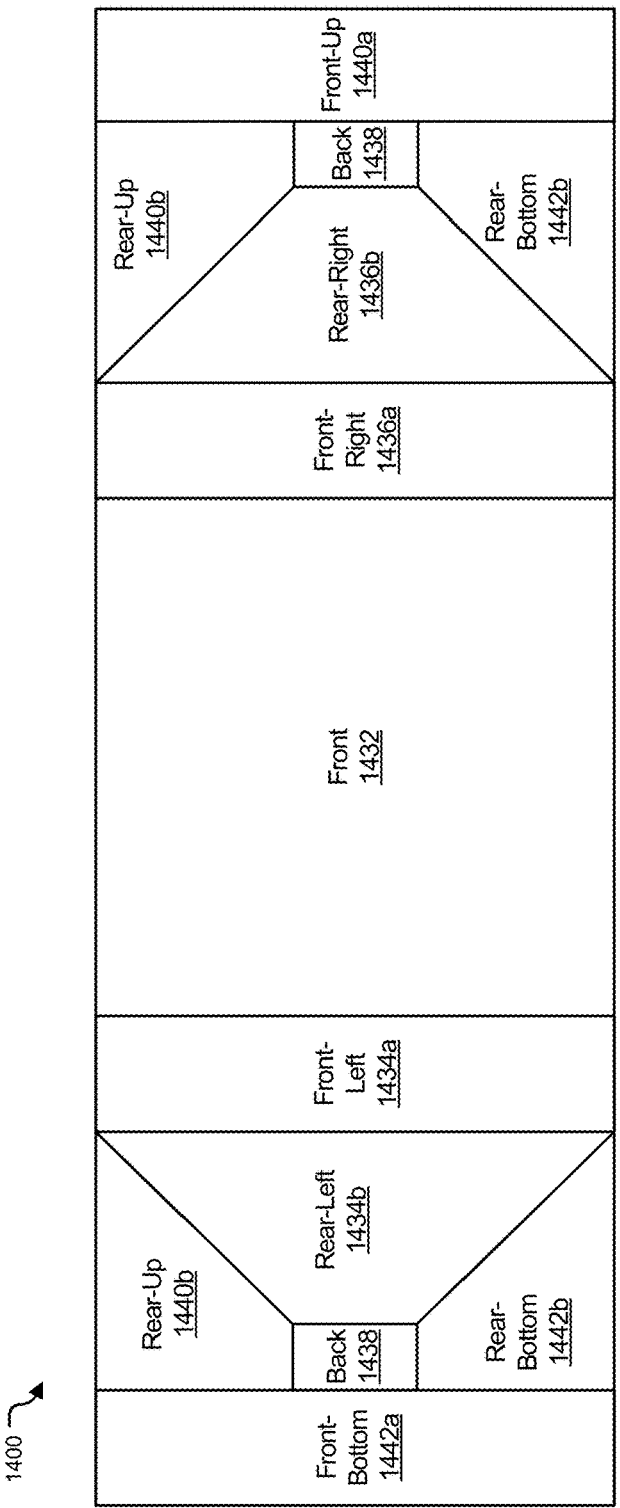
FIG. 14 is a diagram illustrating another example of a frame packing structure for the modified truncated square pyramid mapping.

FIG. 14 illustrates another example of a frame packing structure 1400 for the modified truncated square pyramid mapping. In this example, the rear up, bottom, and back views have been split in half, and the halves have been packed with their respective rear-left 1434*b* and rear-right 1436*b* views. Specifically, the left half of the rear-up 1440*b* view and the left half of the rear-bottom 1442*b* view have been packed, with the rear-left 1434*b* view, around the left half of the back 1438 view. The combined "left" views are the packed adjacent to the front-left 1434*a* view, with the rear-left 1434*b* view placed adjacent to the front-left 1434*a* view. The front-left 1434*a* view is itself packed adjacent to the left edge of the front 1432 view.

Similarly, the right half of the rear-up 1440*b* view and the left half of the rear-bottom 1442*b* view have been packed, with the rear-right 1436*b* view, around the right half of the back 1438 view. The combined "right" views are then packed adjacent to the front-right 1436*a* view, with the rear-right 1436*b* view placed adjacent to the front-right 1436*a* view. The front-right 1436*a* view is itself packed adjacent to the front 1432 view. Finally, the front-bottom 1442*a* view is rotated and packed to the left of the combined left views, and the front-up 1440*a* view is rotated and packed to the right of the combined right views.

FIG. 13 and FIG. 14 provide just two examples of the various ways in which the modified truncated square mapping illustrated in FIG. 9 can be packed into a rectangular frame structure. Other variations are possible, each possibly providing different advantages. For example, the example format of FIG. 14 may provide less distortion in the left-to-right transition when the frame is encoded, while sacrificing some distortion in the up-to-bottom transition. As another example, the example format of FIG. 13 may be simpler to generate.

In various implementations, a front view in the frame packing structures discussed above can represent a 90-degree field of view. For example, when a 360-degree spherical representation of a video frame is mapped to the faces of a cube, one face of the cube can represent a 90-degree field of view by virtue of each face including an eighth of the available pixels. When the base plane (which, as noted above, can be designated as the front view) of the truncated square pyramid shape maps one face of the cube, the base plane can map a 90-degree field of view. In the various frame packing structures discussed above, the areas outside of the 90-degree field of view can be packed into an area in the frame packing structures that is equivalent in size and/or shape to the front view. In such a frame packing structure, viewable area that is preserved at full resolution may be only 90 degrees of view, since any area outside of 90 degrees may be compacted into the left, right, up, and bottom views.

In various implementations, the field of view that includes full-resolution data can be increased by increasing the size of the base plane of the truncated square pyramid shape. That is, a larger area can be preserved at full resolution, where the area may be larger than the aforementioned cube face. As a result, the resolution of the back face may be decreased, or the size of the frame packing structure may increase, or both may occur.

Figure 15:
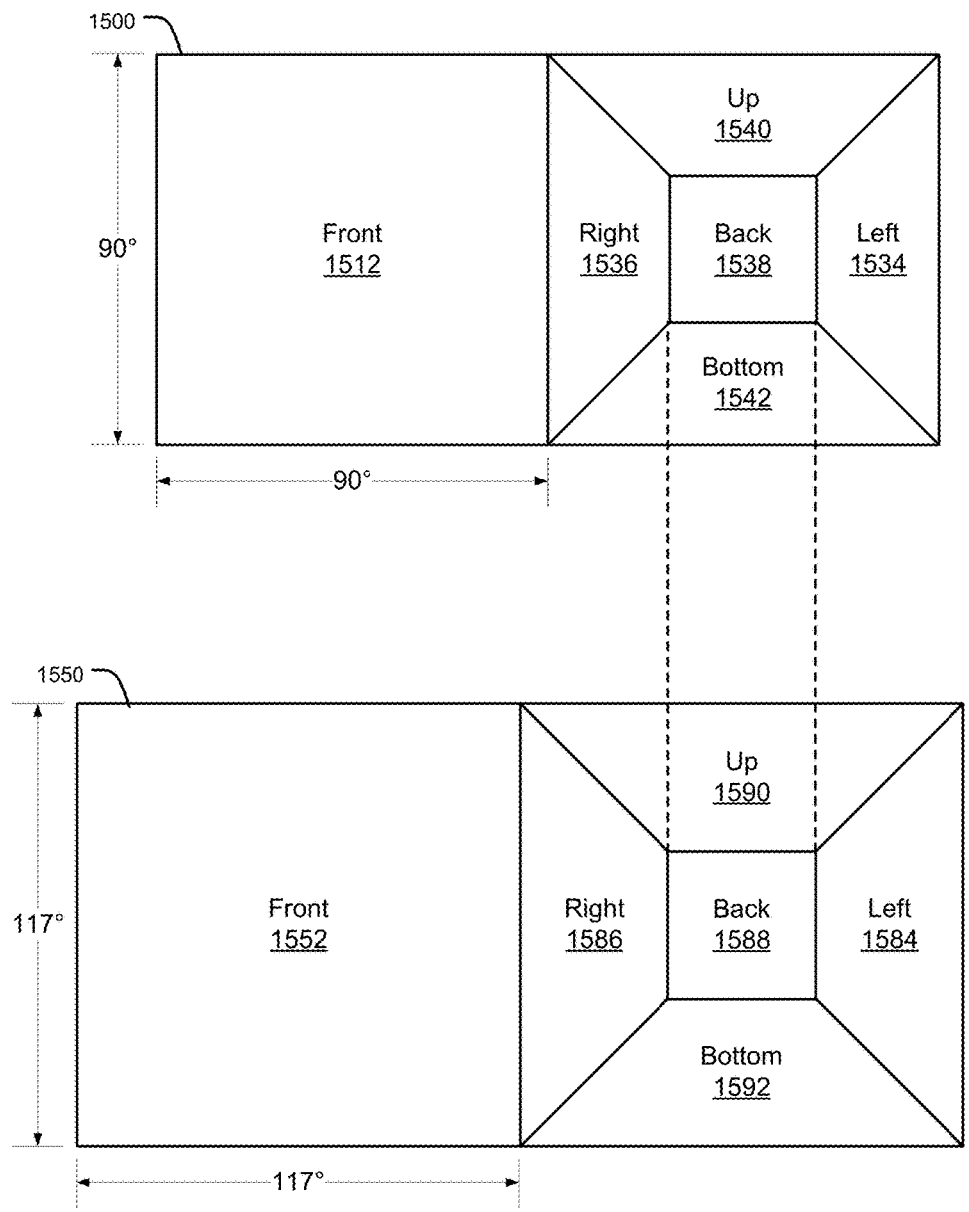
FIG. 15 is a diagram illustrating an example where, in order to increase the field of view, a larger frame packing structure is being used that preserves the resolution of the back view.

FIG. 15 illustrates an example where, in order to increase the field of view, a larger frame packing structure 1550 is being used that preserves the resolution of the back 1588 view. FIG. 15 illustrates an example of a first frame packing structure 1500, where the front 1512 view represents a 90-degree field of view. In this first frame packing structure 1500, the left 1534, right 1536, up 1540, and bottom 1542 views are packed with the back 1538 in an area equivalent in size to the front 1512 view.

FIG. 15 also illustrates an example of a second frame packing structure 1550, where the front 1552 view is 30% larger, and thus represents a 117-degree field of view. To create this 177-degree field of view, pixels that would otherwise be in the left 1584, right 1586, up 1590 and bottom 1592 views are instead in the front 1552 view. The area in the second frame packing structure 1550 for the left 1584, right 1586, up 1590, and bottom 1592 views can thus be smaller relative to the size of the front 1552 view, compared to the area occupied by these views in the first frame packing structure 1500. In this second frame packing structure 1550, the size of the back 1588 view is the same as the size of the back 1538 view in the first frame packing structure 1500, so that the resolution of the back 1588 view can be maintained. The overall size of the second frame packing structure 1550 is thus larger: for example, the first frame packing structure may be 2000 pixels wide and 1000 pixels high, while the second frame packing structure may be 2,600 pixels wide and 1,300 pixels wide.

FIG. 15 illustrates one example where the field of view that is preserved at full resolution is expanded beyond 90 degrees. In various implementations, the field of view can be increased even further. In various implementations, the resolution of the back view can also be decreased, so that the size of the frame packing structure need not be greatly increased.

Figure 16A:
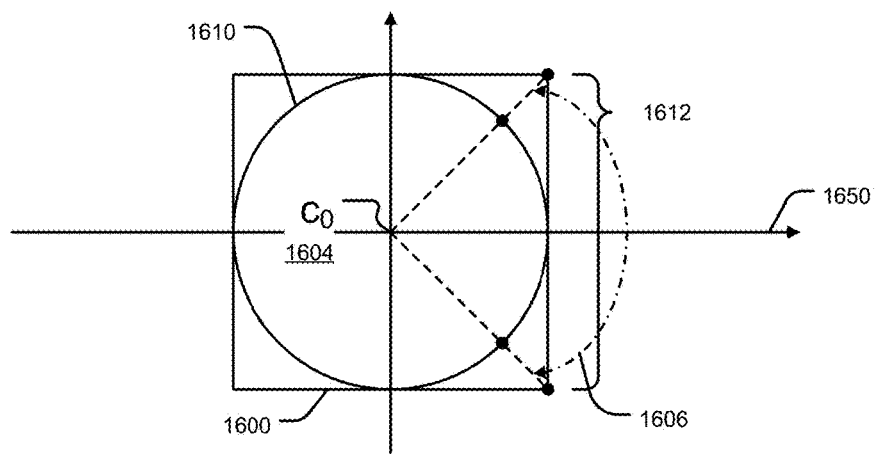
FIG. 16A and FIG. 16B are diagrams illustrating an example of one technique that is based on an offset 1604 from the center of a sphere, where the sphere is a spherical representation of 360-degree video data.
Figure 16B:
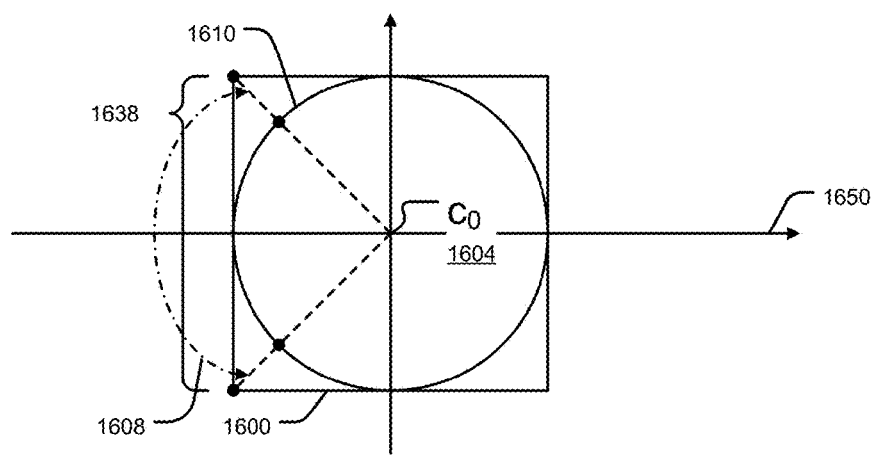

Various techniques can be used to determine a mapping from spherical video data to the planes of a truncated square pyramid, where the mapping includes a particular field of view. FIG. 16A and FIG. 16B illustrate an example of one technique that is based on an offset 1604 from the center of a sphere 1610, where the sphere 1610 is a spherical representation of 360-degree video data. In some examples, the sphere 1610 includes the video data for one video frame. In some examples, the technique illustrated by FIG. 16A and FIG. 16B and the examples that follow can be used across multiple video frames.

In the example of FIG. 16A and FIG. 16B, cube 1600 is illustrated overlaying the sphere 1610, for reference. As discussed above, in some examples, video data from the sphere 1610 can be mapped to planes provided by the faces of the cube 1600. In these examples, the planes can then be mapped to the planes provided by the faces of a truncated square pyramid. In some examples, the spherical video data can be mapped directed to the faces of a truncated square pyramid.

The example of FIG. 16A and FIG. 16B is further presented from a side view of the sphere 1610 and the reference cube 1600, such that the view intended to be in front of the viewer is to the right and the view intended to be behind the viewer is to the left. As such, the front face 1612 of the cube 1600 is on the right in the illustrations, and the back face 1638 of the cube is on the left.

In this example, the offset 1604, labeled co, is zero. An offset of zero corresponds to a center of the sphere 1610 and a forward field of view 1606 of 90 degrees. That is, as illustrated in FIG. 16A, pixels from 0 degrees to 45 degrees in all directions from a central axis 1650 through the center of the sphere 1610 and the center of the forward view can be mapped to the front face 1612 of the cube 1600. At an offset of zero, the backward field of view 1608 is also 90 degrees. As illustrated in FIG. 16B, pixels from 0 degrees to 45 in all directions from the central axis 1650 can be mapped to the back face 1638 of the cube 1600. In FIG. 16B, the pixels determined at 180 degrees on the central axis 1650 from the direction used to determine the pixels for the front view.

In the example of FIG. 16A and FIG. 16B, the pixels that are not mapped to the front face 1612 or the back face 1638 of the cube 1600 can be mapped to the remaining up, down, left, and right faces of the cube 1600.

Figure 17A:
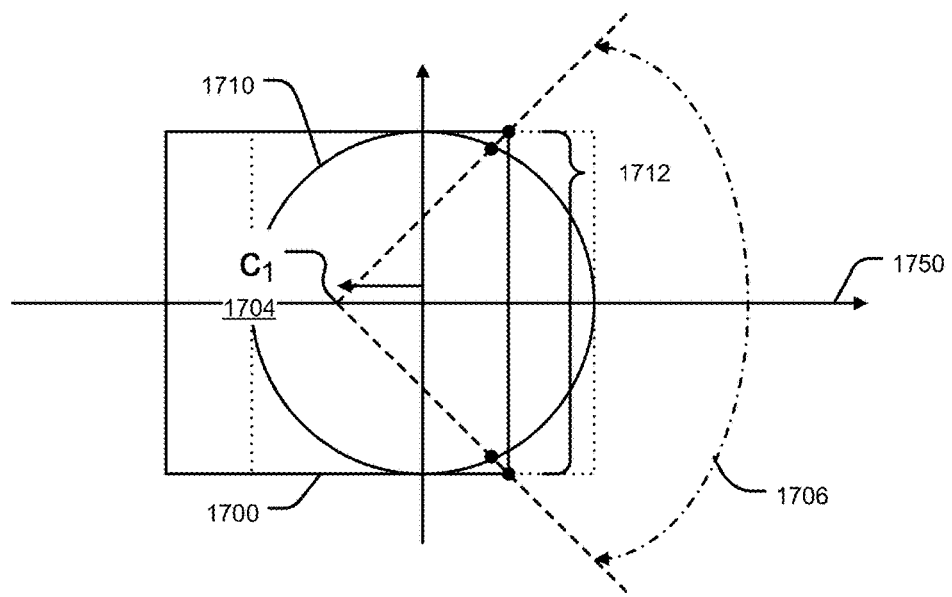
FIG. 17A and FIG. 17B are diagrams illustrating another example of a technique that uses an offset to determine a mapping of spherical video data to the planes provided by the faces of a cube.
Figure 17B:
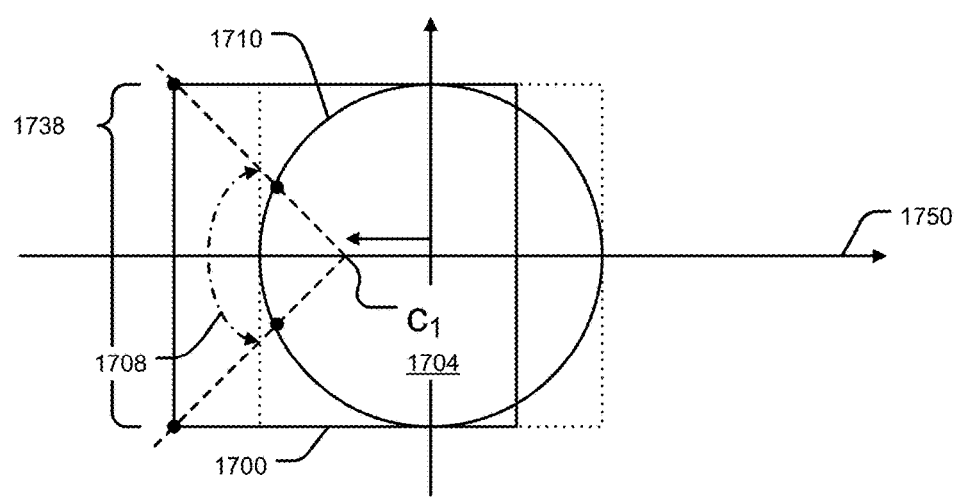

FIG. 17A and FIG. 17B illustrate another example of a technique that uses an offset 1704 to determine a mapping of spherical video data to the planes provided by the faces of a cube 1700. As in the previous example, the offset 1704 is from the center of a sphere 1710, where the sphere 1710 is a spherical representation of 360-degree video data. The cube 1700 is illustrated overlaying the sphere 1710, for reference purposes. As in the previous example, the sphere 1610 and cube 1600 are illustrated from a side view, with the front face 1712 of the cube 1700 (corresponding to the view intended to be in front of the viewer) on the right and the back face 1738 of the cube 1700 (corresponding to the view intended to be the view behind the viewer) on the left.

In the example of FIG. 17A and FIG. 17B, the offset 1704 is halfway between the center of the sphere 1610 and the back side of the sphere 1610. That is, if the radius of the sphere 1610 is 1, then the offset 1704 is at −½. As illustrated in FIG. 17A, using a negative offset 1704 can increase the forward field of view 1706. For example, at an offset 1704 of −½ the radius of the sphere 1710, the forward field of view 1706 is 135 degrees. That is, pixels at 67.5 degrees from a central axis 1750 through the center of the sphere 1710 and the center of the forward view can be mapped to the front face 1712 of the cube 1700. To maintain the resolution of the front face 1712 of the cube 1700, the size of the front face 1712 can be increased to include the pixels that are beyond the 90 degree field of view.

As illustrated in FIG. 17B, at a negative offset, the backward field of view 1708 is reduced. For example, at an offset 1704 of −½ the radius of the sphere 1710, the backward field of view 1708 is 45 degrees. That is, pixels at 22.5 degrees in all directions from the central axis 1750 (at 180 degrees from the front view) can be mapped to the back face 1738 of the cube 1700. In this example, because fewer pixels are mapped to the back face 1738 of the cube, the size of the back face 1738 can be reduced.

Figure 18A:
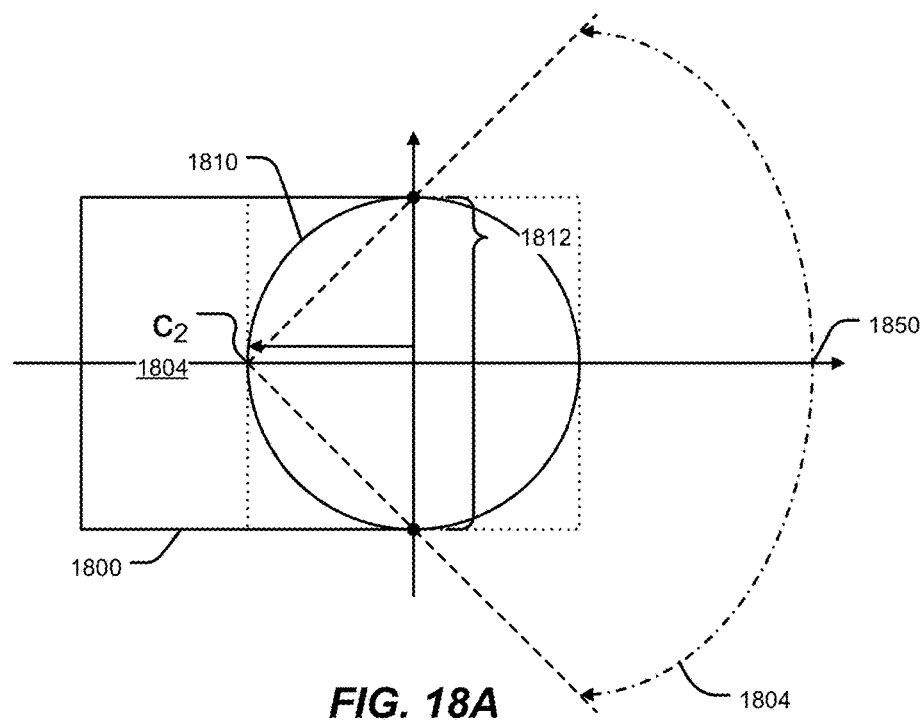
FIG. 18A and FIG. 18B are diagrams illustrating another example of a technique that uses an offset to determine a mapping of spherical video data to the planes provided by the faces of a cube.
Figure 18B:
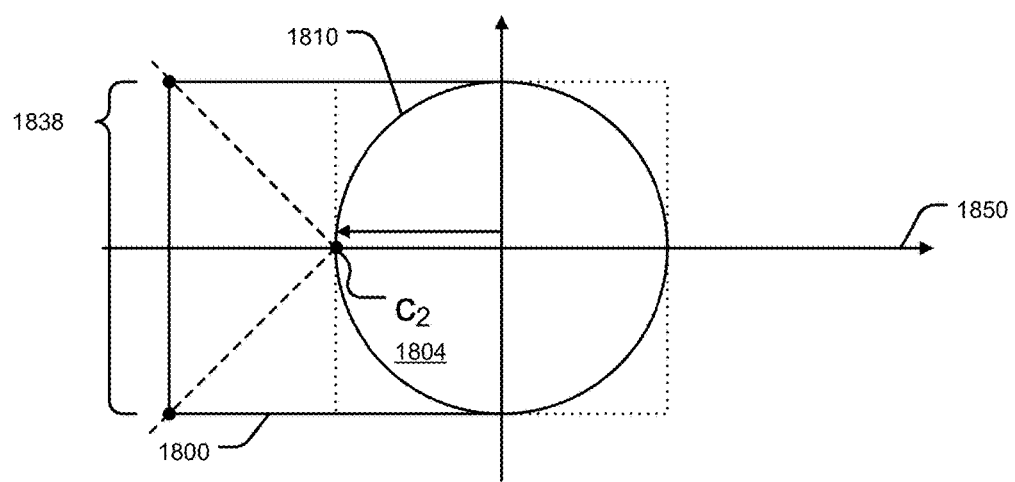

FIG. 18A and FIG. 18B illustrate another example of a technique that uses an offset 1804 to determine a mapping of spherical video data to the planes provided by the faces of a cube 1800. The offset 1804 is from the center of a sphere 1810, where the sphere 1810 is a spherical representation of 360-degree video data. The cube 1800 is illustrated overlaying the sphere 1810, for reference purposes. As in the previous examples, the sphere 1810 and cube 1800 are illustrated from a side view, with the front face 1812 of the cube 1800 on the right and the back face 1838 of the cube 1800 on the left.

In the example of FIG. 18A and FIG. 18B, the offset 1804 is at the back side of the sphere 1810. That is, if the radius of the sphere 1810 is 1, the offset 1804 is at −1. As illustrated in FIG. 18A, with the offset 1804 at the back side of the sphere 1810, the forward field of view is 180 degrees. That is, pixels from the forward half of the sphere 1810 (e.g., all pixels 90 degrees from a central axis 1850 from the center of the sphere 1810 to the center of the field of view) can be mapped to the front face 1812 of the cube 1800. To maintain the resolution of the forward view, the size of the front face 1812 can be increased to accommodate to the additional pixels.

As illustrated in FIG. 18B, with the offset 1804 at the back side of the sphere 1810, the backward field of view is 0 degrees, such that no pixels from the sphere 1810 are used for the backward view. Having no backward view can be used in cases where it is assumed that the viewer will not see any part of the backward view. In other cases, a backward view can be preserved for example by having a minimum size of the back face 1838 of the cube, as discussed further below.

In various implementations, the offset, δ, described in the above examples can be computed for any desired forward field of view. In these implementations, the offset can be computed as follows:

$$\delta = \frac{90° - FOV_{front}}{90°}$$

Once the offset is determined, the backward field of view can be calculated, as follows:

$$FOV_{back} = 90°(1+\delta)$$

Figure 19:
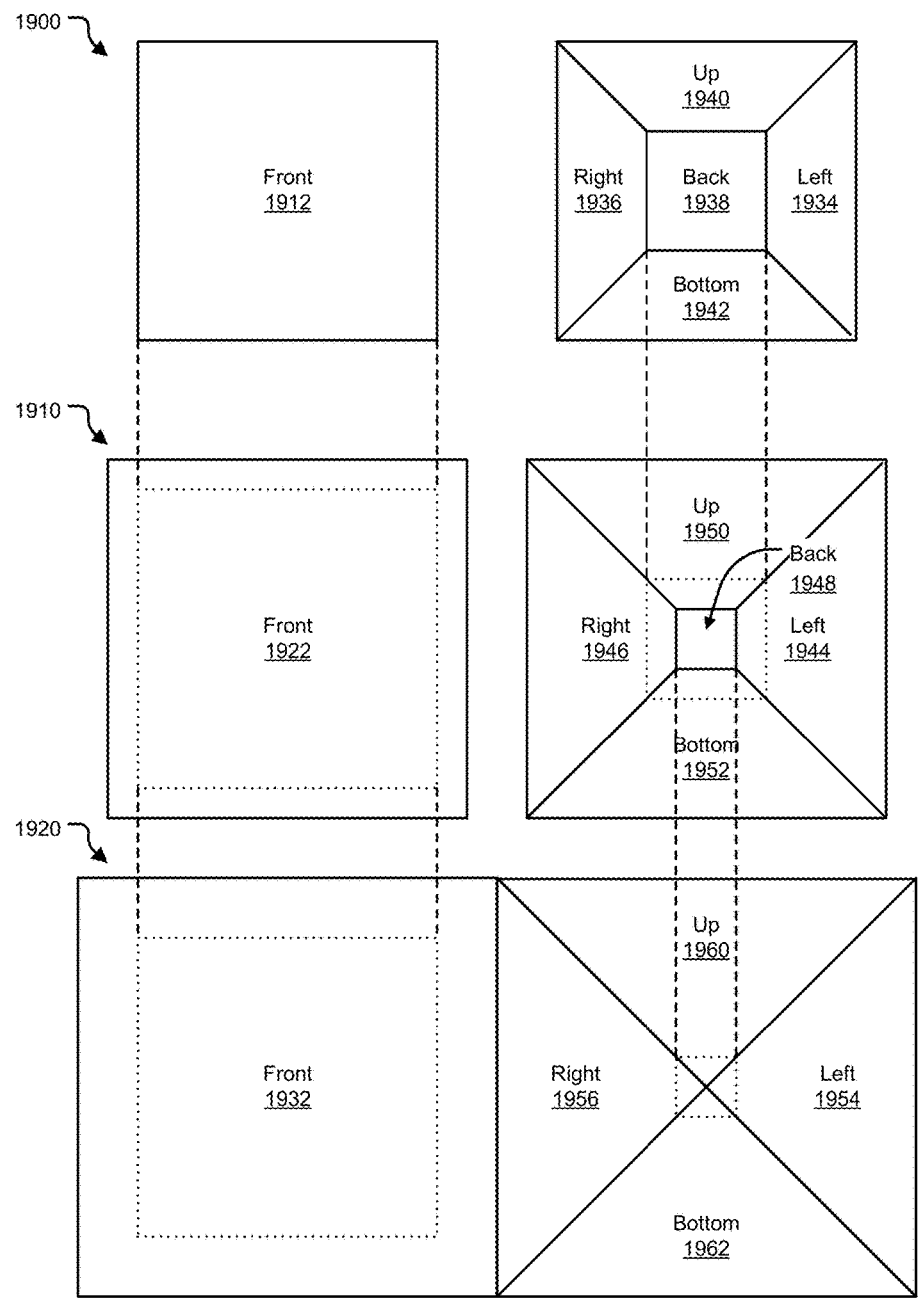
FIG. 19 is a diagram illustrating examples of mappings of 360-degree spherical video data to the planes provided by a truncated square pyramid.
Figure 20:
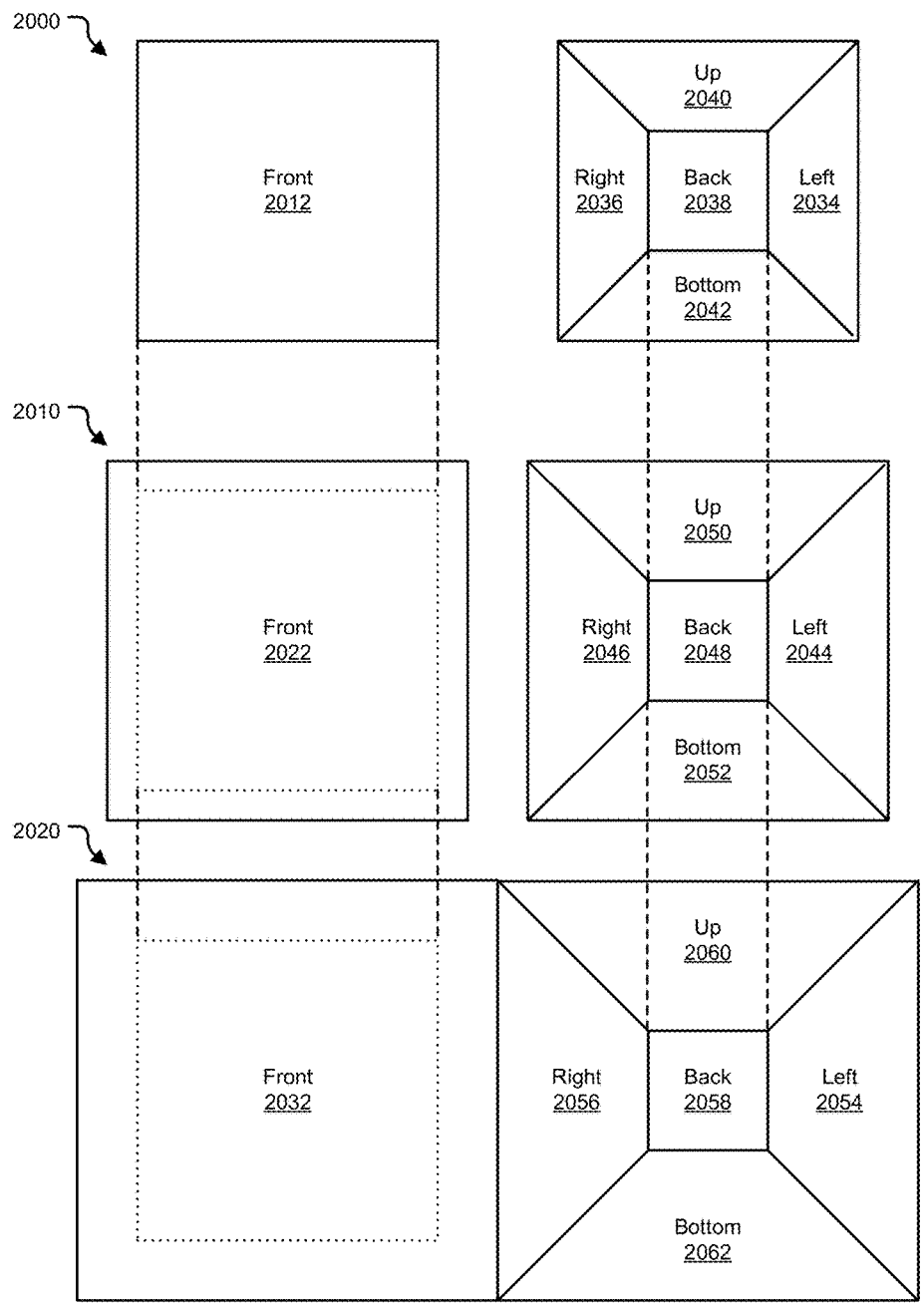
FIG. 20 is a diagram illustrating three examples of mappings for different fields of view for the same spherical video data, where a minimum size of the back view is used.

FIG. 19 illustrates examples of mappings of 360-degree spherical video data to the planes provided by a truncated square pyramid. As discussed above, the spherical video data can be mapped to the planes provided by the faces of a cube. The planar data can then be warped to the planes provided by the faces of a truncated square pyramid. For example, the back face of the cube can be shrunk (for example by decreasing the resolution or quality) to top of the truncated square pyramid. As further example, the top, bottom, left, and right faces of the cube can be warped to the trapezoidal shape of the sides of the truncated square pyramid, for example by gradually reducing the resolution or quality of the data in the cubical planes to fit the trapezoidal shape.

In other examples, the spherical 360-degree video data can be mapped directly to the planes provided by the faces of a truncated square pyramid, using various mathematical transformations.

FIG. 19 illustrates three examples of mappings for different fields of view for the same spherical video data. Each of the first example mapping 1900, the second example mapping 1910, and the third example mapping 1920 show the data mapped to the planes provided by a truncated square pyramid. For ease of illustration, the planes are shown as the data would appear when packed, with the data for the front view packed into a square-shaped format and the data for the up, bottom, left, right, and back views packed into a square of the same size as the front view. It is understood that the data for each plane can be packed into different configurations and orientations, such as those discussed above.

The first example mapping 1900 illustrates an example mapping for a 90-degree field of view. In this example, the size of the front 1912 is such that the pixels in the front 1912 view are at full resolution. That is, the front 1912 view has adequate space for each pixel in a 90-degree field of view to be coded at full resolution. Also in this example, a particular size for the back 1938 view has been selected, where the size can determine a resolution for the back 1938 view. That is, the pixels for a 90-degree field of can be compacted (e.g., by downscaling, down-sampling, or some other method) to fit without the back 1938 view. The number of pixels mapped to each of the up 1940, bottom 1942, left 1934, and right 1936 views, and the resolutions of each of these views, can be determined from the size of the front 1912 and/or back 1938 views. For example, an edge of the up 1940, down 1942, left 1934, and right 1936 views that is adjacent to the front 1912 view can be at full resolution, while an edge of the up 1940, down 1942, left 1934, and right 1936 views that is adjacent to the back 1938 view can be the same resolution as the back 1938 view. Between the front 1912 and the back 1938 views, the resolution of the up 1940, down 1942, left 1934, and right 1936 views can decrease gradually.

In the second example mapping 1910, the forward field of view has been increased. For example, the forward field of view can be 135 degrees, or some other value that is greater than 90 degrees. In this example, a rearward offset can be used to determine the portion of the spherical video data that is to be mapped to the forward and backwards views. The resolution of the front 1922 view can be maintained, meaning that the front 1922 view can include all the pixels, at the same resolution, as are included in the front 1922 view when the field of view is 90 degrees. To accommodate the greater field of view, the size of the front 1922 view can be increased to include the additional pixels. The larger size of the front 1922 view can include pixels that were previously mapped to the up 1950, bottom 1952, left 1944, and right 1946 views.

In the second example mapping 1910, the back 1948 view has been reduced in proportion to the increase in of the front 1922 view. For example, the back 1948 view can include a 35 degree field of view, or some other field of view that is less than 90 degrees. In this example, the number of pixels mapped to the back 1948 view may be reduced, and/or resolution or quality of the back 1948 may be reduced. The mappings for the up 1950, bottom 1952, left 1944, and right 1946 views can also be adjusted for the larger forward field of view and the smaller backward field of view. For example, an edge of each of the up 1950, bottom 1952, left 1944, and right 1946 views that is adjacent to the front 1922 view can be adjusted to the have the same resolution as the front 1922 view and an edge that is adjacent to the back 1948 view can have the same resolution back view, with the resolution changing gradually from the front 1922 to the back 1948. In some cases, the up 1950, bottom 1952, left 1944, and right 1946 views have the same number of pixels as when the forward field of view is 90 degrees. In some cases, the up 1950, bottom 1952, left 1944, and right 1946 views have viewer pixels than when the forward field of view is 90 degrees.

The third example mapping 1920 illustrates an example of a 180 degree forward field of view. As in the previous example, the size of the front 1932 view has been increased to accommodate the larger field of view. For example, the enlarged front 1932 view can include all the pixels that are included in the front 1932 view when the forward field of view is 90 degrees, plus the additional pixels for the forward field of view to include 180 degrees.

At the offset that results in an 180 degree forward field of view, as illustrated by the third example mapping 1920, the backward field of view is reduced to zero. Thus in the third example mapping 1920, the up 1960, bottom 1962, left 1954, and right 1956 views can each include pixels at full resolution at an edge adjacent to the front 1932 view and pixels at a resolution approaching zero towards the back view, possibly with a gradual change in between.

In some cases, having no part of the spherical video data that is mapped to the back view is acceptable. In these cases, data from, for example, the left 1954 and right 1956 views can be provided to the viewer as the viewer turns to the left or right. A temporary reduction in quality is allowed while the system provides a new mapping corresponding to the direction the viewer is now facing.

In some cases, a back view is preserved for all forward fields of view, so that any temporary reduction in quality as the viewer turns can be reduced. Each of the first example mapping 2000, the second example mapping 2010, and the third example mapping 2020 show the data mapped to the planes provided by a truncated square pyramid. For ease of illustration, the planes are shown as the data would appear when packed, with the data for the front view packed into a square-shaped format and the data for the up, bottom, left, right, and back views packed into a square of the same size as the front view. It is understood that the data for each plane can be packed into different configurations and orientations, such as those discussed above.

The first example mapping 2000 illustrates an example mapping for a 90-degree field of view. In this example, the size of the front 2012 is such that the pixels in the front 2012 view are at full resolution. Also in this example, a particular size for the back 2038 view has been selected, where the size can determine a resolution for the back 2038 view. The number of pixels mapped to each of the up 2040, bottom 2042, left 2034, and right 2036 views, and the resolutions of each of these views, can be determined from the size of the front 2012 and/or back 2038 views.

In the second example mapping 2010, the forward field of view has been increased to a view that is greater than 90 degrees, such as 135 degrees. In this example, a rearward offset can be used to determine the portion of the spherical video data that is to be mapped to the front 2022 view. Also in this example, the size of the back 2048 view has been limited to a minimum size. For example, in the second example mapping 2010, the back 2048 view includes at least the same data as is included in the back 2038 view when the forward field of view is 90 degrees. In other examples, the minimum size of the back 2048 view can be less than 90 degrees and greater than the size otherwise dictated by the rearward offset of this example.

In the second example mapping 2020, the up 2050, bottom 2052, left 2044, and right 2046 views can be adjusted for the larger field of view in the front 2022 view and/or the size of the back 2048 view. For example, the up 2050, bottom 2052, left 2044, and right 2046 views may include fewer pixels that is the case in the first example mapping 2010, where the pixels removed from the up 2050, bottom 2052, left 2044, and right 2046 views are included in the front 2022 view, at full resolution.

In the third example mapping 2020, the forward field of view has been increased to a view that includes 180 degrees, and the size of the front 2032 view has been increased accordingly. As in the previous example, the field of view for the back 2058 has been limited to a minimum size, in this case a 90-degree field of view. Each of the up 2060, bottom 2062, left 2054, and right 2056 views, though possibly mapping a smaller portion of the spherical video data, can include a gradual change in resolution between an edge adjacent to the front 2032 view and an edge adjacent to the back 2058 view.

In each of the second example mapping 2010 and the third example mapping 2020, and in other, similar examples, a back view is preserved when the forward field of view is increased. In these examples, a smoother transition can be achieved as the viewport moves from front to back, as discussed previously.

Figure 21:
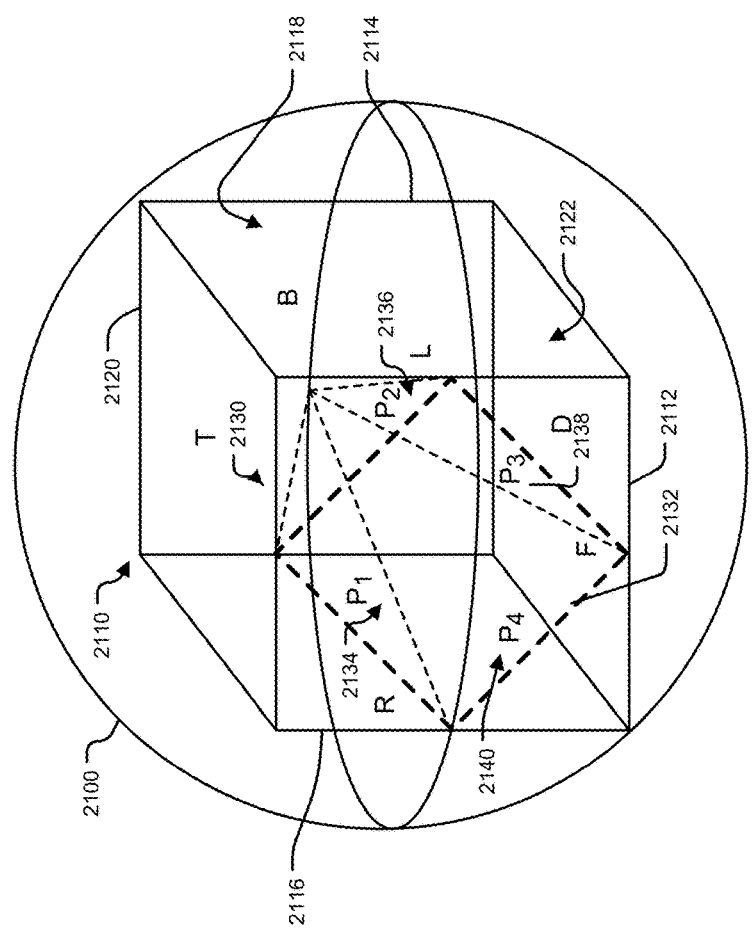
FIG. 21 is a diagram illustrating another example shape for mapping the pixels in 360-degree virtual environment.

FIG. 21 illustrates another example shape for mapping the pixels in 360-degree virtual environment, represented by a sphere 2100 of pixels. In this example, the sphere 2100 of data can be mapped to the faces of a cube 2110. The faces of the cube 2110 can be designated as a front 2112 face, a back 2118 face, a left 2114 face, a right 2116 face, an top 2120 face, and a bottom 2122 face.

As discussed above, the six faces of the cube 2110 can represent the video data from the sphere 2100 at full resolution. To reduce the size of the video data, the six faces of the cube 2110 can be mapped to square a pyramid shape 2130, where the square base 2132 of the pyramid shape 2130 is oriented towards the front 2112 face of the cube, and has been turned 45 degrees with respect to the front 2112 face of the cube 2110. The top of the pyramid shape 2130 is further aligned with the center of the back 2118 view. Each of the four sides of the pyramid shape 2130 can further be designated a P1 2134, P2, 2136, P3 2138, and P4 2140. Pixels from the left 2114, right 2116, top 2120, and bottom 2122 faces of the cube can be allocated to P1 2134, P2, 2136, P3 2138, and P4 2140 in various ways. For example, one face can be mapped to one side of the pyramid shape 2130 (e.g, P1 2134 maps the right 2116 face, P2 2136 maps the top 2120 face, P3 maps the left 2114 face, and P4 maps the bottom 2122 face). Alternatively, one side of the pyramid shape 2130 can map parts of several faces. For example, P1 2134 can map some of the right 2116 and top 2120 faces, P2 2136 can map some of the top 2120 and left 2114 faces, P3 can map some of the left 2114 and bottom 2122 faces, and P4 21140 can map some of the bottom 2122 and right 2116 faces. In each of these examples, the back 2118 face is excluded.

Figure 22:
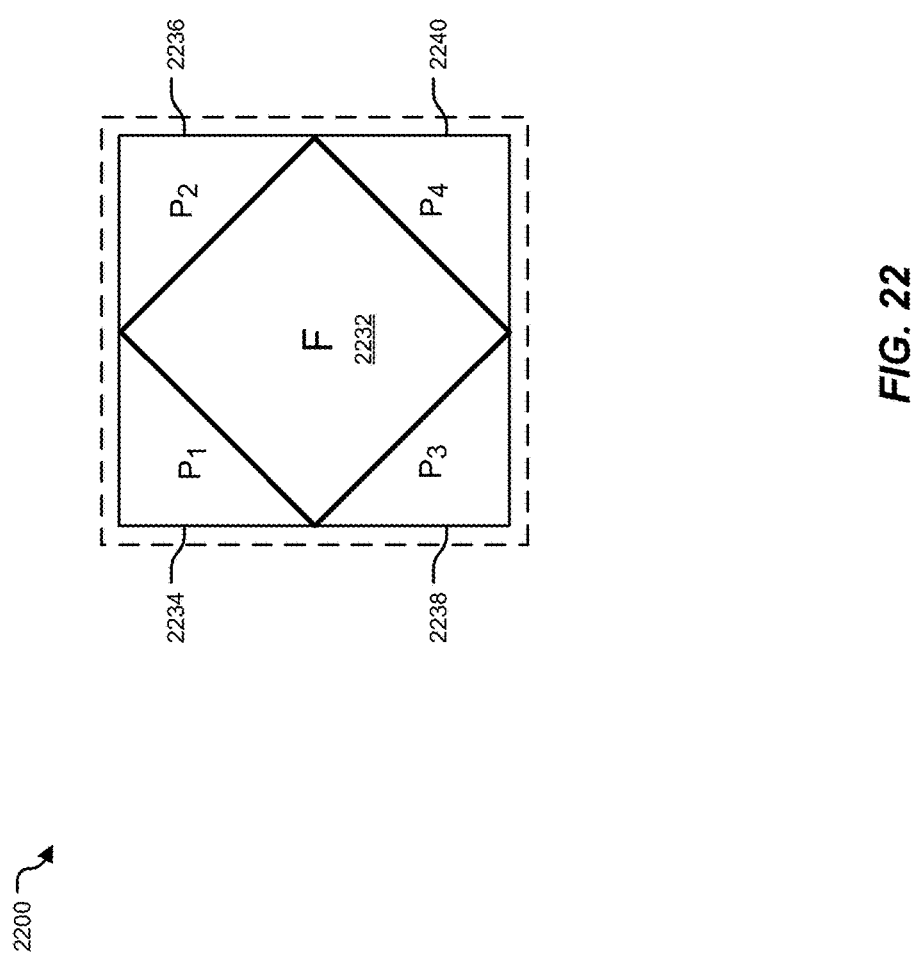
FIG. 22 is a diagram illustrating an example of a frame packing structure for the pyramid shape illustrated in FIG. 21.

FIG. 22 illustrates an example of a frame packing structure 2200 for the pyramid shape illustrated in FIG. 21. In FIG. 22, the front view 2232 (that is, the base of the pyramid shape) is positioned in the middle of the frame packing structure 2200, with the sides of the square base of the pyramid at 45-degree angles to the sides of the frame packing structure 2200. The sides of the pyramid shape, P1 2234, P2 2236, P3 2238, and P4 2240, can be positioned in the corners of the frame packing structure 2200. As discussed above, P1 2234, P2 2236, P3 2238, and P4 2240 can store all or part of the left, right, up, and bottom views. In various implementations, the frame packing structure 2200 can be extended so that each of P1 2234, P2 2236, P3 2238, and P4 2240 capture more, possibly overlapping data. Extending the frame packing structure 2200 may improve the resolution at the boundaries of P1 2234, P2 2236, P3 2238, and P4 2240. The extended area is illustrated in FIG. 22 by a dashed line.

The coding techniques discussed herein may be implemented in an example video encoding and decoding system. In some examples, a system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable the source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 23:
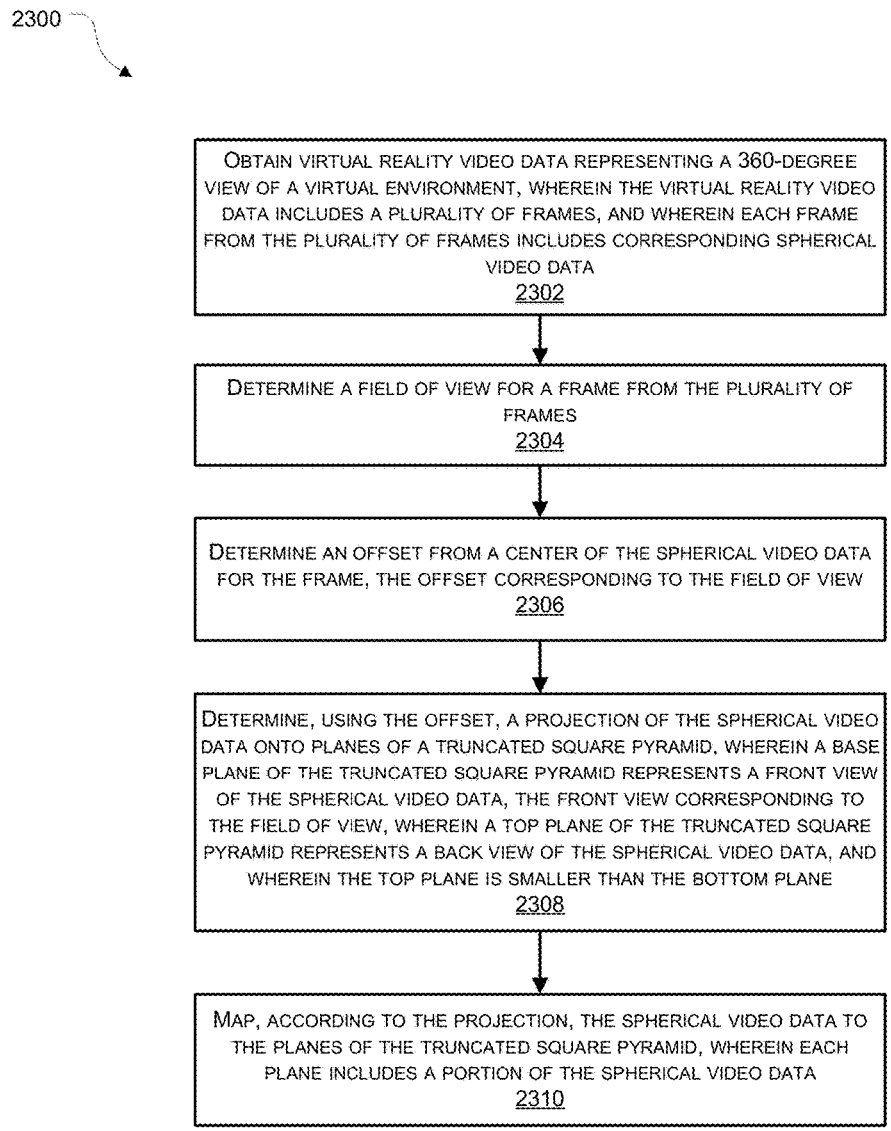
FIG. 23 is a flow diagram illustrating an example of a process for mapping a 360-degree video frame to the planes of a truncated square pyramid described herein.

FIG. 23 illustrates an example of a process 2300 for mapping a 360-degree video frame to the planes of a truncated square pyramid, as described herein. At 2302, the process 2300 includes obtaining virtual reality video data representing a 360-degree view of a virtual environment, wherein the virtual reality video data includes a plurality of frames, and wherein each frame from the plurality of frames includes corresponding spherical video data. As discussed above, the 360-degree video data can be obtained using a video capture device configured to capture all or most of the view in all directions from the point of view of the camera.

At 2304, the process 2300 includes determining a field of view for a frame from the plurality of frames. Determining the field of view can include, for example, determining how many degrees of the spherical video data can be visible to a viewer. For example, the field of view can be 90 degrees or greater. In some cases, determining the field of view can also include determine a direction within the spherical video data that is intended to be in front of the viewer.

At 2306, the process 2300 includes determining an offset from a center of the spherical video data for the frame, the offset corresponding to the field of view. For example, for a given field of view, the offset can be computed according to the equation provided above.

At 2308, the process 2300 includes determining, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the bottom plane. In accordance with the geometry of a truncated square pyramid, the base plane and the top plane are each square in shape. Determining the projection can include determining a point on a plane from the planes of the truncated square pyramid and determining a pixel from the spherical video data that corresponds to the point on the plane. In some cases, the top plane has a lower resolution than the base plane.

At 2310, the process 2300 includes mapping, according to the projection, the spherical video data to the planes of the truncated square pyramid, wherein each plane includes a portion of the spherical video data. Mapping the spherical video data can include using the determined points on the plane and the corresponding pixels, and arranging the data for the pixels according to the shape of the plane. In some cases, mapping can also include modifying a resolution of the pixels, such as downscaling or down-sampling the pixel data to fit into a smaller area of the planes of the truncated square pyramid.

In some examples, the planes of the truncated square pyramid include a first side plane, a second side plane, a third side plane, and a fourth side plane, corresponding to, for example, and up view, a down view, a left view, and a right view, respectively, where the directions are relative to the determined field of view. In these examples, each of the first side plane, the second side plane, the third side plane, and the fourth side plane include one edge that is adjacent to the base plane, one edge that is adjacent to the top plane, and two edges that are adjacent to two other of the first side plane, the second side plane, the third side plane, and the fourth side plane. In some examples, a resolution of each of the first side plane, the second side plane, the third side plane, and the fourth side plane decreases from the edge adjacent to the base plane to the edge adjacent to the top plane.

In some cases, top plane has a minimum size that is irrespective of the offset, wherein the minimum size is greater than zero. In these cases, at least some part of the spherical video data is mapped to the top plane, and a back view is made available. In some cases, such as when the top plane does not have a minimum size, the offset can correspond to a field of view that makes a size of the top plane zero.

In some examples, determining the projection includes determining, using the offset, a first projection of a first portion of data from the spherical video data onto the base plane. Determining the projection can also include determining, using the offset, a second projection of a second portion of data from the spherical video data onto the top plane, wherein the top plane includes to a view that is 180 degrees from a center point of the field of view.

In some examples, determining the projection includes determining, using a size of the base plane and a size of the top plane, a third projection of a third portion of data from the spherical video data onto a first side plane, the third projection including a view above the field of view. For example, the third projection can include a view at 90 degrees (or other suitable angle) above the field of view. Determining the projection can further include determining, using a size of the base plane and a size of the top plane, a fourth projection of a fourth portion of data from the spherical video data onto a second side plane, the fourth projection including a view below the field of view. For example, the fourth projection can include a view at 90 degrees (or other suitable angle) below the field of view. Determining the projection can further include determining, using a size of the first square plane and a size of the second square plane, a fifth projection of a fifth portion of data from the spherical video data onto a third side plane, the fifth projection including a view to the right of the field of view. For example, the fifth projection can include a view at 90 degrees (or other suitable angle) right from the field of view. Determining the projection can further include determining, using a size of the first square plane and a size of the second square plane, a sixth projection of a sixth portion of data from the spherical video data onto a fourth side plane, the sixth projection including a view to the left of the field of view. For example, the sixth projection can include a view at 90 degrees (or other suitable angle) left from the field of view.

In some examples, the spherical video data, once mapped to the planes of a truncated square pyramid, can be packed into a rectangular format. For example, the base plane can be packed into a square-shaped format. The top plane can be packed with planes for each of the up, bottom, left, and right views in a square format that is the same size as the base plane. The combined top and side planes can be placed next to the base plane in various combinations, including dividing the combined planes in various ways. Once packed into a rectangular format, the video data can be encoded, stored, and/or transmitted.

In some examples, the process 2300 may be performed by a computing device or an apparatus, such as the video a video encoding device. In some cases, the computing device or apparatus may include a processor, microprocessor, microcomputer, or other component of a device that is configured to carry out the steps of the process 2300. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

The process 2300 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 24:
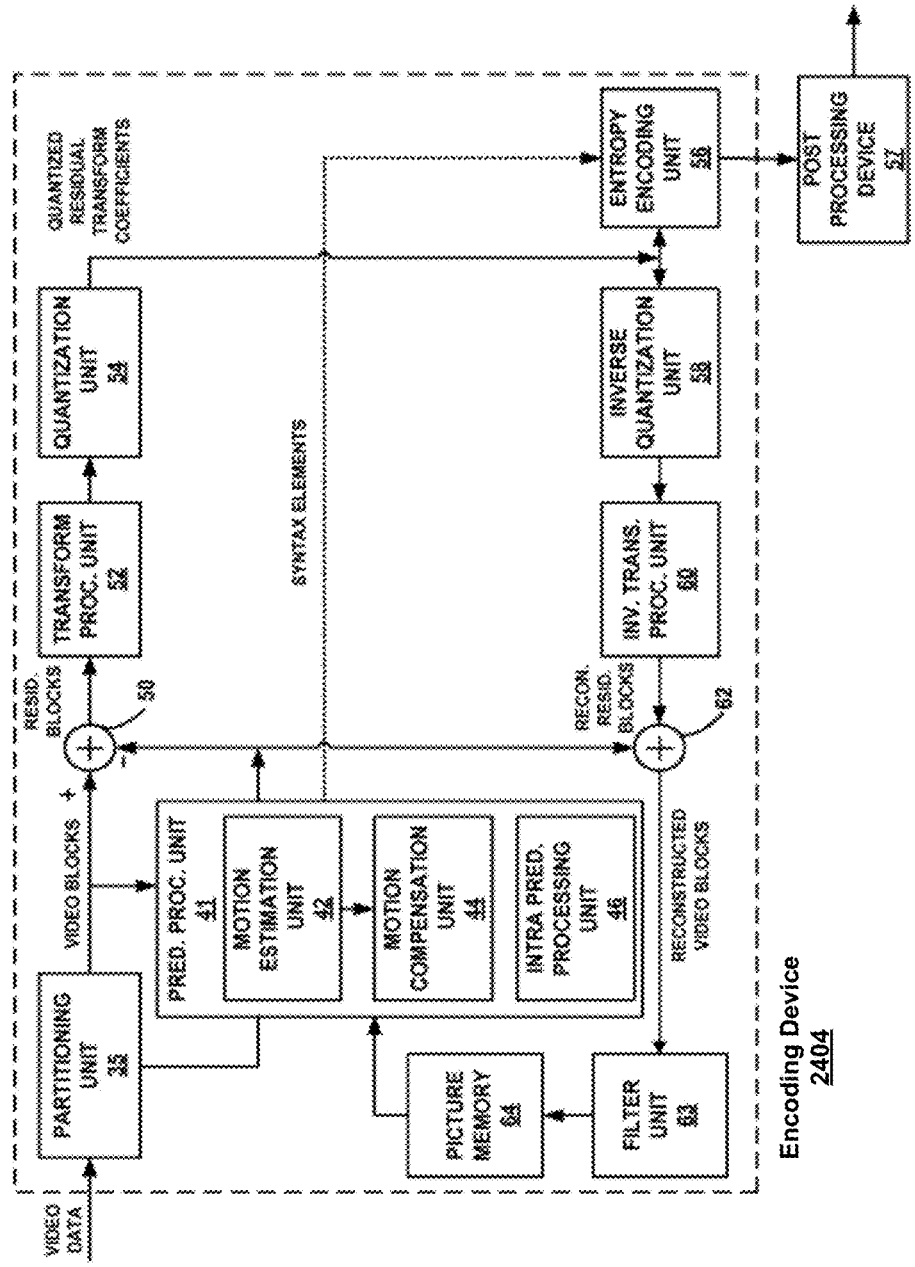
FIG. 24 is a block diagram illustrating an example encoding device.
Figure 25:
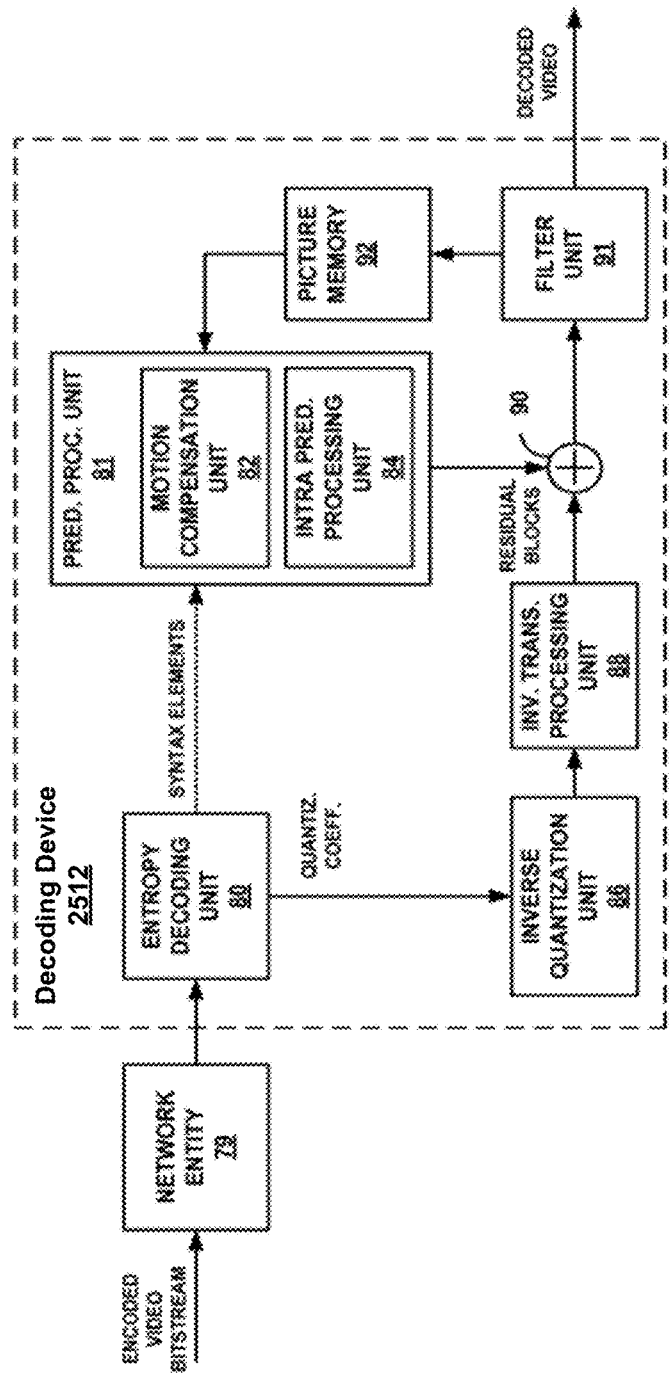
FIG. 25 is a block diagram illustrating an example decoding device.

Specific details of an encoding device 2404 and a decoding device 2512 are shown in FIG. 24 and FIG. 25, respectively. FIG. 24 is a block diagram illustrating an example encoding device 2404 that may implement one or more of the techniques described in this disclosure. Encoding device 2404 may, for example, generate the syntax structures described herein (e.g., the syntax structures of a VPS, SPS, PPS, or other syntax elements). Encoding device 2404 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 2404 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 2404 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 24 as being an in loop filter, in other configurations, filter unit 63 may be implemented as a post loop filter. A post processing device 57 may perform additional processing on encoded video data generated by the encoding device 2404. The techniques of this disclosure may in some instances be implemented by the encoding device 2404. In other instances, however, one or more of the techniques of this disclosure may be implemented by post processing device 57.

As shown in FIG. 24, the encoding device 2404 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 2404 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 2404 may calculate values for sub-integer pixel positions of reference pictures stored in picture memory 64. For example, the encoding device 2404 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 2404 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 2512 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 2404 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 2404 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 2512, or archived for later transmission or retrieval by the decoding device 2512. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 2404 of FIG. 24 represents an example of a video encoder configured to generate syntax for a encoded video bitstream. The encoding device 2404 may, for example, generate VPS, SPS, and PPS parameter sets as described above. The encoding device 2404 may perform any of the techniques described herein, including the processes described above. The techniques of this disclosure have generally been described with respect to the encoding device 2404, but as mentioned above, some of the techniques of this disclosure may also be implemented by post processing device 57.

FIG. 25 is a block diagram illustrating an example decoding device 2512. The decoding device 2512 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 2512 may, in some examples, perform a decoding pass generally reciprocal to the encoding pass described with respect to the encoding device 2404 from FIG. 24.

During the decoding process, the decoding device 2512 receives an encoded video bitstream that represents video blocks of an encoded video slice and associated syntax elements sent by the encoding device 2404. In some embodiments, the decoding device 2512 may receive the encoded video bitstream from the encoding device 2404. In some embodiments, the decoding device 2512 may receive the encoded video bitstream from a network entity 79, such as a server, a media-aware network element (MANE), a video editor/splicer, or other such device configured to implement one or more of the techniques described above. Network entity 79 may or may not include the encoding device 2404. Some of the techniques described in this disclosure may be implemented by network entity 79 prior to network entity 79 transmitting the encoded video bitstream to the decoding device 2512. In some video decoding systems, network entity 79 and the decoding device 2512 may be parts of separate devices, while in other instances, the functionality described with respect to network entity 79 may be performed by the same device that comprises the decoding device 2512.

The entropy decoding unit 80 of the decoding device 2512 entropy decodes the bitstream to generate quantized coefficients, motion vectors, and other syntax elements. Entropy decoding unit 80 forwards the motion vectors and other syntax elements to prediction processing unit 81. The decoding device 2512 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 2512 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 2404 during encoding of the video blocks to calculate interpolated values for sub-integer pixels of reference blocks. In this case, motion compensation unit 82 may determine the interpolation filters used by the encoding device 2404 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 2404 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 2512 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 25 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for encoding video data, comprising:
   obtaining virtual reality video data representing a 360-degree view of a virtual environment, wherein the virtual reality video data includes a plurality of frames, and wherein each frame from the plurality of frames includes corresponding spherical video data;
   determining a field of view for a frame from the plurality of frames;

determining an offset from a center of the spherical video data for the frame, the offset corresponding to the field of view;

determining, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the base plane; and mapping, according to the projection, the spherical video data to the planes of the truncated square pyramid, wherein each plane includes a portion of the spherical video data.

2. The method of claim 1, wherein determining the projection includes:

determining a point on a plane from the planes of the truncated square pyramid; and determining a pixel from the spherical video data that corresponds to the point on the plane.

3. The method of claim 1, wherein the planes of the truncated square pyramid include a first side plane, a second side plane, a third side plane, and a fourth side plane, wherein each of the first side plane, the second side plane, the third side plane, and the fourth side plane include one edge that is adjacent to the base plane, one edge that is adjacent to the top plane, and two edges that are adjacent to two other of the first side plane, the second side plane, the third side plane, and the fourth side plane.

4. The method of claim 3, wherein a resolution of each of the first side plane, the second side plane, the third side plane, and the fourth side plane decreases from the edge adjacent to the base plane to the edge adjacent to the top plane.

5. The method of claim 1, wherein the top plane has a lower resolution than the base plane.

6. The method of claim 1, wherein the top plane has a minimum size that is irrespective of the offset, wherein the minimum size is greater than zero.

7. The method of claim 1, wherein the offset corresponds to a field of view that makes a size of the top plane zero.

8. The method of claim 1, wherein determining the projection includes:

determining, using the offset, a first projection of a first portion of data from the spherical video data onto the base plane; and determining, using the offset, a second projection of a second portion of data from the spherical video data onto the top plane.

9. The method of claim 1, wherein determining the projection includes:

determining, using a size of the base plane and a size of the top plane, a third projection of a third portion of data from the spherical video data onto a first side plane, the third projection including a view above the field of view;

determining, using a size of the base plane and a size of the top plane, a fourth projection of a fourth portion of data from the spherical video data onto a second side plane, the fourth projection including a view below the field of view;

determining, using a size of the base plane and a size of the top plane, a fifth projection of a fifth portion of data from the spherical video data onto a third side plane, the fifth projection including a view to the right of the field of view; and determining, using a size of the base plane and a size of the top plane, a sixth projection of a sixth portion of data from the spherical video data onto a fourth side plane, the sixth projection including a view to the left of the field of view.

10. The method of claim 1, wherein the field of view is greater than 90 degrees.

11. The method of claim 1, further comprising:
packing each of the planes in a rectangular format.

12. A device for coding video data, comprising:
a memory configured to store video data; and
a video coding device in communication with the memory, wherein the video coding device is configured to:

obtain virtual reality video data representing a 360-degree view of a virtual environment, wherein the virtual reality video data includes a plurality of frames, and wherein each frame from the plurality of frames includes corresponding spherical video data;

determine a field of view for a frame from the plurality of frames;

determine an offset from a center of the spherical video data for the frame, the offset corresponding to the field of view;

determine, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the base plane; and map, according to the projection, the spherical video data to the planes of the truncated square pyramid, wherein each plane includes a portion of the spherical video data.

13. The device of claim 12, wherein determining the projection includes:

determining a point on a plane from the planes of the truncated square pyramid; and determining a pixel from the spherical video data that corresponds to the point on the plane.

14. The device of claim 12, wherein the planes of the truncated square pyramid include a first side plane, a second side plane, a third side plane, and a fourth side plane, wherein each of the first side plane, the second side plane, the third side plane, and the fourth side plane include one edge that is adjacent to the base plane, one edge that is adjacent to the top plane, and two edges that are adjacent to two other of the first side plane, the second side plane, the third side plane, and the fourth side plane.

15. The device of claim 14, wherein a resolution of each of the first side plane, the second side plane, the third side plane, and the fourth side plane decreases from an edge adjacent to the base plane to an edge adjacent to the top plane.

16. The device of claim 12, wherein the top plane has a lower resolution than the base plane.

17. The device of claim 12, wherein the top plane has a minimum size that is irrespective of the offset, wherein the minimum size is greater than zero.

18. The device of claim 12, wherein the offset corresponds to a field of view that makes a size of the top plane zero.

19. The device of claim 12, wherein determining the projection includes:

determining, using the offset, a first projection of a first portion of data from the spherical video data onto the base plane; and determining, using the offset, a second projection of a second portion of data from the spherical video data onto the top plane.

20. The device of claim 12, wherein determining the projection includes:

determining, using a size of the base plane and a size of the top plane, a third projection of a third portion of data from the spherical video data onto a first side plane, the third projection including a view above the field of view;

determining, using a size of the base plane and a size of the top plane, a fourth projection of a fourth portion of data from the spherical video data onto a second side plane, the fourth projection including a view below the field of view;

determining, using a size of the base plane and a size of the top plane, a fifth projection of a fifth portion of data from the spherical video data onto a third side plane, the fifth projection including a view to the right of the field of view; and determining, using a size of the base plane and a size of the top plane, a sixth projection of a sixth portion of data from the spherical video data onto a fourth side plane, the sixth projection including a view to the left of the field of view.

21. The device of claim 12, wherein the field of view is greater than 90 degrees.

22. The device of claim 12, wherein the video coding device is further configured to:

packing each of the planes in a rectangular format.

23. A non-transitory computer-readable medium comprising instructions that, when executed by one or more processors, cause the one or more processors to perform operations including:

obtaining virtual reality video data representing a 360-degree view of a virtual environment, wherein the virtual reality video data includes a plurality of frames, and wherein each frame from the plurality of frames includes corresponding spherical video data;

determining a field of view for a frame from the plurality of frames;

determining an offset from a center of the spherical video data for the frame, the offset corresponding to the field of view;

determining, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the base plane; and mapping, according to the projection, the spherical video data to the planes of the truncated square pyramid, wherein each plane includes a portion of the spherical video data.

24. The non-transitory computer-readable medium of claim 23, wherein determining the projection includes:

determining a point on a plane from the planes of the truncated square pyramid; and determining a pixel from the spherical video data that corresponds to the point on the plane.

25. The non-transitory computer-readable medium of claim 23, wherein the top plane has a lower resolution than the base plane.

26. The non-transitory computer-readable medium of claim 23, wherein the top plane has a minimum size that is irrespective of the offset, wherein the minimum size is greater than zero.

27. The non-transitory computer-readable medium of claim 23, wherein the offset corresponds to a field of view that makes a size of the top plane zero.

28. The non-transitory computer-readable medium of claim 23, wherein the field of view is greater than 90 degrees.

29. The non-transitory computer-readable medium of claim 23, further comprising instructions that, when executed by one or more processors, cause the one or more processors to perform operations including:

packing each of the planes in a rectangular format.

30. An apparatus comprising:

means for obtaining virtual reality video data representing a 360-degree view of a virtual environment, wherein the virtual reality video data includes a plurality of frames, and wherein each frame from the plurality of frames includes corresponding spherical video data;

means for determining a field of view for a frame from the plurality of frames;

means for determining an offset from a center of the spherical video data for the frame, the offset corresponding to the field of view;

means for determining, using the offset, a projection of the spherical video data onto planes of a truncated square pyramid, wherein a base plane of the truncated square pyramid represents a front view of the spherical video data, the front view corresponding to the field of view, wherein a top plane of the truncated square pyramid represents a back view of the spherical video data, and wherein the top plane is smaller than the base plane; and means for mapping, according to the projection, the spherical video data to the planes of the truncated square pyramid, wherein each plane includes a portion of the spherical video data.

* * * * *